(12) United States Patent
Choudhury et al.

(10) Patent No.: US 10,977,809 B2
(45) Date of Patent: Apr. 13, 2021

(54) DETECTING MOTION DRAGGING ARTIFACTS FOR DYNAMIC ADJUSTMENT OF FRAME RATE CONVERSION SETTINGS

(71) Applicant: Dolby Laboratories Licensing Corporation, San Francisco, CA (US)

(72) Inventors: Anustup Kumar Atanu Choudhury, Campbell, CA (US); Robin Atkins, San Jose, CA (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 198 days.

(21) Appl. No.: 16/214,632

(22) Filed: Dec. 10, 2018

(65) Prior Publication Data

US 2019/0180454 A1 Jun. 13, 2019

Related U.S. Application Data

(60) Provisional application No. 62/597,326, filed on Dec. 11, 2017.

(51) Int. Cl.
| | |
|---|---|
| G06T 7/11 | (2017.01) |
| G06T 7/13 | (2017.01) |
| G06T 7/155 | (2017.01) |
| G06T 7/194 | (2017.01) |
| G06T 7/254 | (2017.01) |

(Continued)

(52) U.S. Cl.
CPC .............. G06T 7/254 (2017.01); G06T 7/11 (2017.01); G06T 7/13 (2017.01); G06T 7/155 (2017.01); G06T 7/194 (2017.01); G06T 7/40 (2013.01); H04N 19/132 (2014.11);
(Continued)

(58) Field of Classification Search
None
See application file for complete search history.

(56) References Cited

U.S. PATENT DOCUMENTS 5,557,684 A * 9/1996 Wang ................. G06K 9/38
348/E5.066
6,449,312 B1 9/2002 Zhang
(Continued)

FOREIGN PATENT DOCUMENTS

| WO | 2011/094164 | 8/2011 |
| WO | 2014/193631 | 12/2014 |
| WO | 2015/130616 | 9/2015 |

OTHER PUBLICATIONS

Dane et al., "Optimal Temporal Interpolation Filter for Motion-Compensated Frame Rate Up Conversion," IEEE Transactions on Image Processing, vol. 15, No. 4, Apr. 2006 (Year: 2006).*

(Continued)

*Primary Examiner* — Soo Shin

(57) ABSTRACT

Motion characteristics related to foreground objects and background regions bordering the foreground objects in images are determined. A frame rate conversion (FRC)-related metadata portion is generated based on the motion characteristics. The FRC-related metadata portion is to be used for determining an optimal FRC operational mode with a downstream device for the images. The images are encoded into a video stream. The FRC-related metadata portion is encoded into the video stream as a part of image metadata. The video stream is caused to be transmitted to the downstream device.

22 Claims, 9 Drawing Sheets

(51) Int. Cl.
*G06T 7/40* (2017.01)
*H04N 19/132* (2014.01)
*H04N 19/139* (2014.01)
*H04N 19/172* (2014.01)
*H04N 19/46* (2014.01)
*H04N 19/543* (2014.01)

(52) U.S. Cl.
CPC ......... *H04N 19/139* (2014.11); *H04N 19/172* (2014.11); *H04N 19/46* (2014.11); *H04N 19/543* (2014.11)

(56) References Cited

U.S. PATENT DOCUMENTS

| | | | |
|---|---|---|---|
| 6,628,715 B1 | 9/2003 | Iu | |
| 7,043,058 B2* | 5/2006 | Cornog | H04N 5/145 348/154 |
| 7,103,231 B2 | 9/2006 | Cornog | |
| 7,965,303 B2 | 6/2011 | Hanaoka | |
| 7,991,196 B2 | 8/2011 | Tener | |
| 8,013,909 B2 | 9/2011 | Nikkanen | |
| 8,150,194 B2 | 4/2012 | Fujibayashi | |
| 8,160,149 B2 | 4/2012 | Demos | |
| 8,208,563 B2 | 6/2012 | Dane | |
| 8,358,696 B2 | 1/2013 | Bukin | |
| 8,462,266 B2 | 6/2013 | Ueno | |
| 8,488,058 B2 | 7/2013 | Kang | |
| 8,537,283 B2 | 9/2013 | Tran | |
| 8,559,517 B2 | 10/2013 | Ogino | |
| 8,634,463 B2 | 1/2014 | Shi | |
| 8,718,143 B2 | 5/2014 | Chen | |
| 8,768,103 B2 | 7/2014 | Ogino | |
| 9,031,131 B1 | 5/2015 | Patankar | |
| 9,129,399 B2 | 9/2015 | Jin | |
| 9,191,682 B2 | 11/2015 | Margerm | |
| 9,357,161 B1* | 5/2016 | Cheng | G06T 3/4007 |
| 2004/0233217 A1 | 11/2004 | Chiu | |
| 2005/0249288 A1 | 11/2005 | Ha | |
| 2007/0071100 A1* | 3/2007 | Shi | H04N 19/537 375/240.16 |
| 2007/0200838 A1 | 8/2007 | Lee | |
| 2007/0211800 A1 | 9/2007 | Shi | |
| 2007/0242748 A1 | 10/2007 | Mahadevan | |
| 2008/0240562 A1* | 10/2008 | Fukuda | H04N 19/587 382/173 |
| 2009/0148058 A1 | 6/2009 | Dane | |
| 2009/0161011 A1 | 6/2009 | Hurwitz | |
| 2010/0046615 A1 | 2/2010 | Chen | |
| 2010/0079669 A1 | 4/2010 | Hattori | |
| 2010/0124361 A1 | 5/2010 | Gaddy | |
| 2010/0177239 A1 | 7/2010 | Servais | |
| 2010/0178038 A1 | 7/2010 | Ju | |
| 2010/0260255 A1 | 10/2010 | Sannidhi | |
| 2011/0206127 A1 | 8/2011 | Nguyen | |
| 2012/0176536 A1 | 7/2012 | Levy | |
| 2013/0002947 A1 | 1/2013 | Mikhalenkov | |
| 2013/0279590 A1 | 10/2013 | Chen | |
| 2014/0055610 A1 | 2/2014 | Ko | |
| 2014/0307166 A1 | 10/2014 | Glen | |
| 2014/0340502 A1 | 11/2014 | Freeman | |
| 2015/0116513 A1 | 4/2015 | Chen | |
| 2015/0254823 A1 | 9/2015 | Atkins | |
| 2015/0341658 A1 | 11/2015 | Xi | |
| 2018/0020229 A1* | 1/2018 | Chen | H04N 19/176 |
| 2018/0082429 A1 | 3/2018 | Choudhury | |

OTHER PUBLICATIONS

Wang, C. et al "Frame Rate Up-Conversion Using Trilateral Filtering" IEEE Transactions on Circuits and Systems for Video Technology, vol. 20, No. 6, Jun. 2010, pp. 886-893.

Dane, G. et al "Optimal Temporal Interpolation Filter for Motion-Compensated Frame Rate Up Conversion" IEEE Transactions on Image Processing, vol. 15, No. 4, Apr. 2006, pp. 978-991.

Cetin, M., et al., "An Adaptive True Motion Estimation Algorithm for Frame Rate Conversion of High Definition Video", Aug. 2010, located via google scholar, Pattern Recognition (ICPR), 20th Int. Conf., pp. 4109-4112; http://dx.doi.org/10.1109/ICPR.2010.1156.

Huang, A., et al., "Correlation-Based Motion Vector Processing With Adaptive Interpolation Scheme for Motion-Compensated Frame Interpolation", Apr. 2009, Located via Google Scholar, Image Processing, vol. 18, No. 4, pp 740-752, http://dx.doi.org/10.1109/TIP.2008.2010206.

Pesquet-Popescu, B., et al., "Motion Estimation Techniques", 2014, Located via Google Scholar, Telecom ParisTech, pp. 1-76 https://cagnazzo.wp.mines-telecom.fr/files/2013/05/poly_me.pdf.

Youn, J., et al., "Motion vector refinement for high-performance transcoding", Mar. 1999, Located via Google Scholar, Multimedia, IEEE, vol. 1, No. 1, pp. 30-40 http://dx.doi.org/10.1109/6046.748169.

Tasdizen, O., et al., "Recursive Dynamically Variable Step Search Motion Estimation Algorithm for High Definition Video", Aug. 2010, Located via Google Scholar, Pattern Recognition (ICPR), 20th Int. Cant, pp. 2354-2357; http://dx.doi.org/10.1109/ICPR.2010.576.

Shimano, M. et al., "Video Temporal Super-resolution Based on Self-similarity", Dec. 2013, Located via Google Scholar, Advanced Topics in Computer Vision, pp. 411-430 http://dx.doi.org/10.1007/978-1-4471-5520-1_14.

Lu, Q., et al., "Motion-Compensated Frame Interpolation With Multiframe-Based Occlusion Handling", Jul. 2015, Located via Google Scholar, Display Technology, vol. 12, No. 1, pp. 45-54 http://dx.doi.org/10.1109/JDT.2015.2453252.

Lee, Sung-Hee., "Adaptive motion-compensated interpolation for frame rate up-conversion", IEEE Transactions on Consumer Electronics, IEEE Service Center, New York, NY,US, vol. 48, No. 3, Aug. 1, 2002, pp. 444-450.

* cited by examiner decode, from a video stream, image frames and an FRC-related metadata portion 452 use the FRC metadata portion to determine an optimal FRC operational mode for the image frames 454 generate, based on the image frames, additional image frames 456 cause the image frames and the additional image frames to be rendered on a display device 458

FIG. 4B

DETECTING MOTION DRAGGING ARTIFACTS FOR DYNAMIC ADJUSTMENT OF FRAME RATE CONVERSION SETTINGS

CROSS REFERENCE TO RELATED APPLICATIONS

This application claims priority to U.S. Provisional Patent Application No. 62/597,326, filed on Dec. 11, 2017, the entire contents of which are hereby incorporated by reference.

TECHNOLOGY

The present invention relates generally to images. More particularly, an embodiment of the present invention relates to detecting motion dragging artifacts for dynamic adjustment of frame rate conversion settings.

BACKGROUND

Image interpolation, which computes a set of plausible interpolated images using two or more adjacent images, has varied applications including but not limited to frame rate conversion (FRC) between different broadcast standards, synthesis of virtual views, animating still images and so on.

Some TV manufacturing companies incorporate built-in motion interpolation technology in their products to perform FRC. A mechanism for FRC can be as simple as merely replicating received images to achieve the desired frame rate. For example, a TV running at an image refresh rate of 120 Hz and receiving a 30 Hz image sequence may simply display each image four consecutive times. The advantage of this solution is that the complexity of the system is very low, at the expense of possibly resulting in motion judder.

Complicated systems can be designed for motion interpolation. However, computational costs of such techniques can be quite high, and may even result in motion dragging artifacts, noticeable lags, and so forth, in viewing image sequences involving motions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4A and FIG. 4B illustrate example process flows; and

DESCRIPTION OF EXAMPLE EMBODIMENTS

Figure 1:
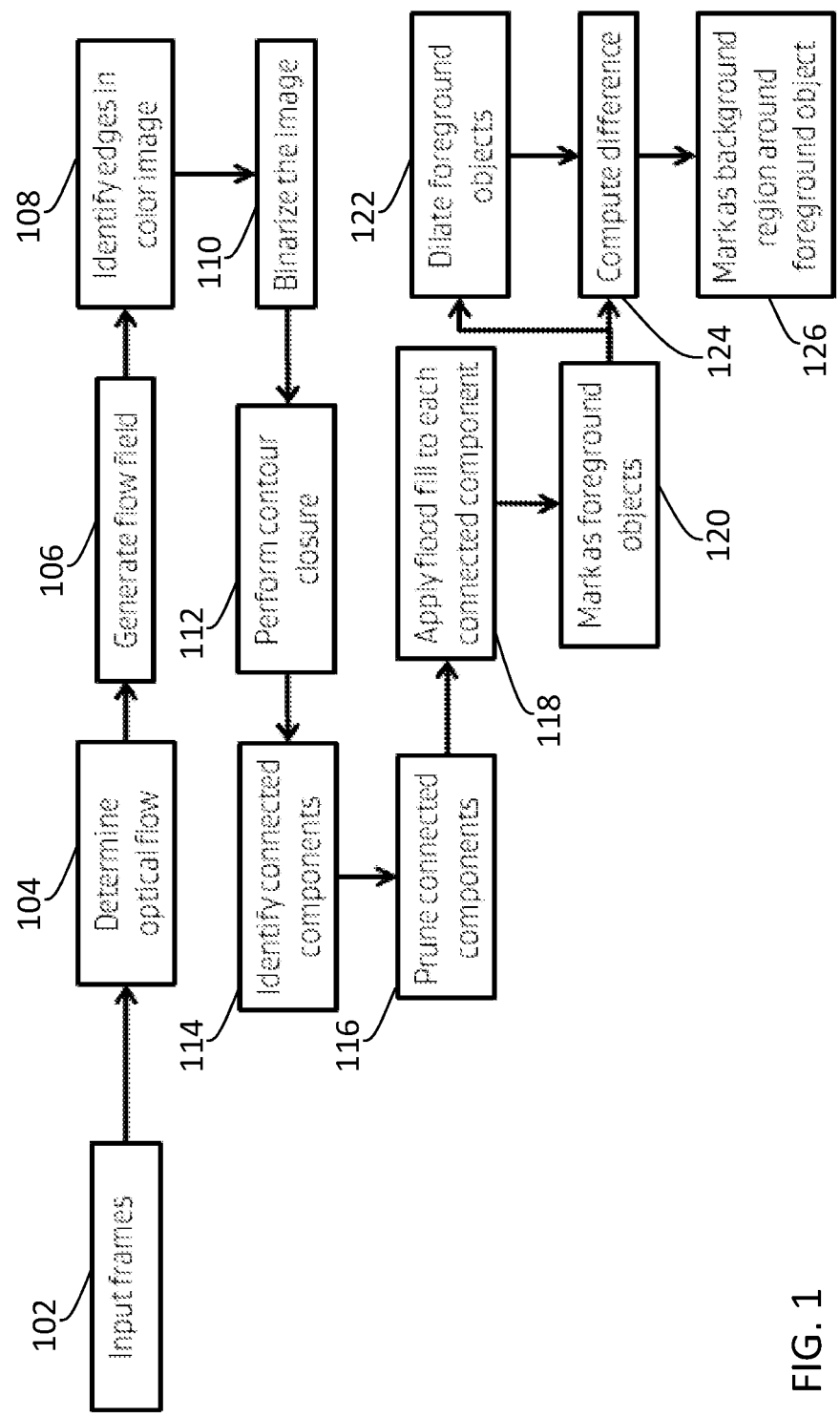
FIG. 1 illustrates an example process flow that can be used to detect foreground and background objects in media content.

Example embodiments, which relate to detecting motion dragging artifacts for dynamic adjustment of frame rate conversion settings, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. FRAME RATE CONVERSION
3. DETERMINING OPTIMAL FRC MODES BASED IMAGE CONTENT ANALYSIS
4. EXAMPLE VIDEO ENCODERS AND DECODERS
5. EXAMPLE PROCESS FLOWS
6. IMPLEMENTATION MECHANISMS—HARDWARE OVERVIEW
7. EQUIVALENTS, EXTENSIONS, ALTERNATIVES AND MISCELLANEOUS

1. GENERAL OVERVIEW

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Example embodiments described herein relate to encoding video data with FRC-related metadata. One or more motion characteristics related to one or more foreground objects and one or more background regions bordering the one or more foreground objects in one or more images are determined. An FRC-related metadata portion is generated based at least in part on the one or more motion characteristics related to the one or more foreground objects and the one or more background regions bordering the one or more foreground objects in the one or more images. The FRC-related metadata portion is to be used for determining an optimal FRC operational mode with a downstream device for the one or more images. The one or more images are encoded into a video stream. The FRC-related metadata portion is encoded into the video stream as a part of image metadata. The video stream is caused to be transmitted to the downstream device.

Example embodiments described herein relate to performing FRC operations using FRC-related metadata. One or more images and a frame rate conversion (FRC)-related metadata portion are decoded from a video stream. The FRC-related metadata portion is generated by an upstream device for the one or more images based at least in part on one or more motion characteristics related to one or more foreground objects and one or more background regions bordering the one or more foreground objects in the one or more images. The one or more motion characteristics are computed after the one or more foreground objects and the one or more background regions are separated based on image content visually depicted in one or more images. The FRC-related metadata portion is used to determine an optimal FRC operational mode for the one or more images. The optimal FRC operational mode is operated to generate, based on the one or more images, zero or more additional images in addition to the one or more images. The one or more images and the zero or more additional images are caused to be rendered on a display device.

In some example embodiments, mechanisms as described herein form a part of a media processing system, including but not limited to any of: cloud-based server, mobile device, encoding device, transcoding device, decoding device, media device, CAVE-type system or wall-sized display, video game device, display device, media player, media server, media production system, camera systems, home-based systems, communication devices, video processing system, video codec system, studio system, streaming server, content service system, handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. FRAME RATE CONVERSION

Image interpolation techniques that are based on optical flow can have varying levels of complexity depending on how an optical flow field is generated such as whether the optical flow field is dense, pixel-based, block-based, how many adjacent images in the past are used, how many adjacent images in the future are used, and so on. As used herein, adjacent images used for image interpolation and/or image replication may refer to (e.g., non-interpolated, non-replicated, pre-interpolated, originally received, etc.) images that are not generated from other images by image interpolation and/or image replication.

In some operational scenarios, correspondences can be computed between adjacent images in a video stream based on optical flow computations. Warping can be performed on the adjacent images to get estimates for the interpolated images. Due to potential ambiguities in computing correspondences in optical flow, however, some of these techniques may need to rely on computationally expensive optimization that involves tuning numerous parameters and thus take long computational times to find optimal FRC settings. In practice the high cost computation may result in perceptible time lags in viewing image sequences involving relatively high motion image content.

In some embodiments, a display system may implement different frame rate conversion (FRC) operational modes, any of which may be selected by the display system by a user manually, according to the user's personal preferences, automatically without user input, etc. In a first FRC operational mode (e.g., OFF), the display system may operate frame rate conversion without performing image interpolation and merely replicate received images. In one or more second FRC operational modes (e.g., LOW, MEDIUM, HIGH, etc.), the display system may operate frame rate conversion with various degrees of complexities. For example, in a FRC LOW mode, the display system may operate frame rate conversion by replicating most received images (3 out of 4 frames while converting a 30 Hz input frame rate to a 120 Hz display-device-specific frame rate) and applying image interpolation only to a small subset of received images (1 out of 4 frames while converting a 30 Hz input frame rate to a 120 Hz display-device-specific frame rate). On the other hand, in a FRC HIGH mode, the display system may operate frame rate conversion by applying image interpolation to most received images, replicating none of received images or replicating only a small subset of the received images.

In some embodiments, FRC operational modes as described herein may further comprise FRC LOW, intermediate FRC operational modes, etc., in which image interpolations and image replications are applied to (e.g., static, fixed, dynamically settable, etc.) various numbers of received images.

In many operational scenarios, when the display system operates in a non FRC OFF mode such as the FRC HIGH mode, undesirable results that may not exist in an FRC OFF mode can be introduced. For instance, a media content may be shot or produced with a moving camera and may depict fast moving foreground objects on a background with a different image texture that that of the foreground objects. If the display system is set to a FRC HIGH mode, although motions seem relatively smooth for both the foreground objects and the background (e.g., background objects, etc.) in the actual scene from which the media content is shot or produced, there is an undesirable artifact (similar to halo effect) along the boundary of the foreground objects in the rendered images in the FRC HIGH mode. These motion artifacts in the rendered images cause viewers to perceive a different (e.g., artificial, non-existent in the actual scene, etc.) type of motion from that of the foreground objects as well as that of the background, and can be strongly objectionable to some viewers. In contrast, if the display system is set to a FRC OFF mode, although the motion may be not smooth and may result in judder, at least there is consistency across the entire frame in each of the rendered images, relatively free of any different type of motion such as motion dragging, halo effect, etc. The judder perceived in the rendered images in the FRC OFF mode may be acceptable, and even satisfactory, to viewers because the foreground object (e.g., in focus, etc.) and the background region around the foreground object have their respective consistent motions despite the judder.

Techniques as described herein can be dynamically applied to avoiding/reducing image interpolation, for certain types of input image content, which is susceptible to generating objectionable visual artifacts. Even in operational scenarios in which image interpolation is suitable (or image interpolation for certain types of input image content is not susceptible to generating objectionable visual artifacts), these techniques can be dynamically applied to selecting the best FRC operational mode possible (e.g., with the best strength/level for image interpolation, etc.).

In some embodiments, a display system under techniques as described herein can implement a mechanism that dynamically adjusts FRC operational modes depending on actual motion types and texture information of foreground objects and the background found in the input image content. Motion statistics including but not limited to magnitudes and directions pertaining to motion vectors and texture information of the scene may be used to identify foreground objects and separate these objects from the background, and to predict whether the scene is prone to having unwanted motion dragging artifacts after image interpolation. Depending on the prediction, the display system can select or set the best FRC operational mode, further taking into consideration any available user preferences, manual system settings, and so forth.

Some or all techniques as described herein may be implemented by one or more devices. By way of example but not limitation, two or more process flows may be implemented by an image processing device such as an upstream device, a downstream device, a video encoder, a video transcoder, a video decoder, a set-top box, sync devices, streaming servers, streaming clients, and so forth. In a first process flow, foreground objects for each depicted scene in one or more depicted scenes of input image content are estimated, and separated from the background in the depicted scene. In a second process flow, the foreground objects and the background for each such depicted scene is analyzed to predict if the depicted scene is likely to have motion dragging artifacts when images of the depicted scene are interpolated and rendered.

FRC settings in a display system may be set based on predictions whether performing image interpolation on the depicted scenes is likely to have motion dragging artifacts. In some embodiments, depending on motion dragging predictions made for the depicted scenes in the input image data in these process flows, an upstream device may generate image metadata that comprises one or more appropriate motion dragging flags. The upstream device can transmit/signal images of the depicted scenes with the image metadata comprising the motion dragging flags to a downstream recipient device operating display system. The downstream recipient device, or the display system, can use the signaled motion dragging flags to (e.g., dynamically, etc.) determine appropriate FRC modes for the display system to operate in rendering the images of the depicted scenes.

3. DETERMINING OPTIMAL FRC MODES BASED IMAGE CONTENT ANALYSIS

FIG. 1 illustrates an example process flow that can be used to detect foreground and background objects in media content in a given image sequence. The detected foreground and background objects in the media content may be used in determining optimal FRC operational modes, used in other operations, etc., in an image processing system with respect to the given image sequence in the set of ordered images. In some embodiments, one or more computing devices or components (e.g., an encoding device/module, a transcoding device/module, a decoding device/module, a media device/module, etc.) may perform this process flow. Example image processing systems may include, but are not necessarily limited to only, any combination of: video encoders, video decoders, video streaming servers, video streaming clients, set-top devices, video decoders, display devices, storage devices, sync devices, etc.

In block 102, the image processing system receives the image sequence comprising one or more sets of images ("input frames"; which are pre-interpolated images relative to the image processing system) that support an input frame rate. Each set of images may represent two or more adjacent images (or two or more adjacent input frames) along a common time reference (e.g., a normal playing time, etc.) represented in the image sequence. As used herein, adjacent images refer to non-interpolated, non-replicated images that are timewise next (e.g., consecutive, sequential, immediately following, immediately preceding, etc.) to each other (or one another) in the image sequence. In some embodiments, a set of images as described herein may form a subdivision of a scene, a single scene, multiple scenes, a single group of pictures (GOP), multiple GOPs, etc.

In block 104, the image processing system calculates/determines optical flows of pixels, pixel blocks between two or more adjacent images in a (e.g., each, etc.) set of images. Correspondences among (or between) the adjacent images may be determined based on one or more optical flow equations, and used to determine/estimate the optical flows as (e.g., pixel-based, pixel-block-based, etc.) motion vectors.

In some embodiments, a motion vector can be computed using a directional offset (or displacement) of an image feature element such as a pixel, a pixel block, etc., from the image feature element's reference coordinates. The directional offset or displacement may be derived from coordinates (e.g., by row and column, an x-y coordinate system in a raster image or an image frame, etc.) of one or more pixels representing an image feature element in a first image (e.g., a currently decoded, processed and/or designated image, etc.) of the adjacent images relative to reference coordinates of correspondence pixels representing the same image feature element in one or more second first images (e.g., one or more reference images, etc.) of the adjacent images.

In some embodiments, characteristics of a motion vector as described herein may comprise a magnitude component and a direction component.

In block 106, the image processing system generates an optical flow field comprising a distribution of the optical flows as represented by the estimated motion vectors. Any combination of one or more optical flow techniques may be used to determine the optical flow and/or to generate the corresponding optical flow field. Example optical flow techniques may include, but are not necessarily limited to only, any of: dense optical flow techniques, pixel-based techniques, block-based techniques, techniques that estimate the apparent motions by using only past images (relative to a currently decoded, processed and/or designated image), techniques that estimate the apparent motions by using only future images (relative to a currently decoded, processed and/or designated image), techniques that estimate the apparent motions by any combination or number of past and future images (relative to a currently decoded, processed and/or designated image), etc. Additionally, optionally, or alternatively, motion estimation as described herein can be performed from only individual (decoded) images, directly from a video bitstream (as received by the display system) that encodes the image sequence, or a combination of the foregoing. For example, motion estimation under techniques as described herein may be solely derived from individual images (e.g., uncompressed images, etc.). Additionally, optionally, or alternatively, at least a part of motion estimation under techniques as described herein may be based on motion information such as (e.g., block-based, etc.) GOP motion information decoded directly from a video stream (or one or more media data bitstreams) encoded with the images.

By way of example but not limitation, the optical flow field may include a respective motion vector at each pixel position of a set of pixel positions spanning an image. The optical flow field contains, or can be used to derive, motion related information such as a motion vector magnitude and a motion vector direction of each pixel in the depicted scene. The motion related information contained in the optical flow field can be used to determine whether a moving foreground object has different flow field characteristics from its background.

In block 108, the image processing system identifies or determines edges in the optical flow field based on motion characteristics of pixels in an image (e.g., each of some or all images, etc.) of the depicted scenes. For example, pixels at or near edges/contours in the image may have different motion characteristics such as different strengths in motion vector magnitudes, different motion vector directions, and so forth.

In block 110, the image processing system binarizes an image to obtain an initial estimate of one or more outlines of one or more components depicted in the image. A combination of one or more binarization methods/algorithms in a variety of binarization methods/algorithms may be used to binarize the image to obtain the initial estimate of the one or more outlines of the one or more components depicted in the image. For example, a robust binarization threshold may be computed using Otsu's method/algorithm that minimizes the intra-class variance between the white and the black pixels. Such binarization threshold can be set, without limitation, to one of: an experimentally chosen value, a computed value, a default value, a dynamically reconfigurable value, and so forth, for the purpose of using the binarized image to provide the initial estimate of the one or more outlines of the one or more components in the image.

In block 112, the image processing system performs contour closure operations to obtain one or more closed boundaries of the one or more components in the binarized image representing the initial estimate of the one or more outlines of the one or more components in the image. A combination of one or more methods/algorithms in a variety of contour closure methods/algorithms may be used to obtain the one or more closed boundaries of the one or more components in the binarized image. For example, dilation operations may be performed using the initial outlines to close any holes that might exist in the boundaries. Additionally, optionally or alternatively, different contour closure methods/algorithms other than dilation-based methods/algorithms may be used to generate the boundaries of the components in the binarized image.

In block 114, the image processing system identifies connected components among the one or more components in the binarized image subsequent to the contour closure operations on the binarized image. The connected components represent a list of candidate foreground objects in the image from which the binarized image is derived.

In block 116, the image processing system prunes the list of candidate foreground objects by eliminating candidate foreground objects that are relatively small (e.g., below a spatial size threshold, below a spatial dimension threshold, below an area size threshold, etc.) or are relatively narrow (e.g., below a height threshold, below a width threshold, below a linear dimension threshold, etc.) from the list.

In block 118, the image processing system applies one or more flood-fill methods/algorithms on each candidate foreground object in the pruned list of candidate foreground objects as represented in the binarized image. A centroid of a connected component may be used as a starting point for the flood-fill methods/algorithms. However, since not all objects are convex objects as depicted in the image, the image processing system may employ one or more tests to confirm if the centroid falls within the boundary (or outline) of the candidate foreground object. If the centroid does not fall within the boundary (or outline) of the candidate foreground object, the image processing system can select a different point such as a point on the boundary of the candidate foreground object as a starting point for flood-fill operations.

In block 120, the image processing system marks or spatially delineates the flood-filled candidate foreground objects in the pruned list of candidate foreground objects in the binarized image as representing one or more foreground objects in the image. The number of flood-filled candidate foreground objects may be no more than the total number of candidate foreground objects in the pruned list of candidate foreground objects.

In some embodiments, the foreground objects as flood filled in the binarized image may be marked or spatially delineated in a first binary mask, which may be a binary valued mask with one (1) for each pixel of the foreground objects and zero (0) for each pixel outside the foreground objects.

In block 122, the image processing system performs morphological operations in the binarized image such as dilation operations on the (flood-filled) foreground objects of the binarized image to generate dilated regions. Pixels in the image corresponding to the dilated regions of the binarized image comprise pixels of the foreground objects as well as pixels of background regions that surround/border the foreground objects. Motion dragging artifacts typically happen along or near a boundary of a foreground object in the background region that surrounds or borders the foreground object.

In block 124, the image processing system determines or generates a difference between the dilated regions and the (flood-filled) foreground objects. The difference represents the background regions that surround/border the foreground objects along or near boundaries of the foreground objects. Image and/or motion characteristics of these background regions may be generated and used for predicting whether motion dragging artifacts are likely to occur around any of the foreground objects in connection with image interpolation/rendering.

In block 126, the image processing system marks or spatially delineates pixels in the image that correspond to the difference between the dilated regions and the flood-filled foreground objects and identifies these pixels as the background regions surrounding/bordering the foreground objects in the image from which the binarized image is derived.

Additionally, optionally or alternatively, in some embodiments, instead of determining or generating the difference between the dilated regions and the (flood-filled) foreground objects to represent the background region, some or all regions outside the foreground objects can be directly marked or spatially delineated as the background region surrounding/bordering the foreground objects without dilating the (flood-filled) foreground objects.

In some embodiments, the background regions surrounding/bordering the foreground objects may be marked or spatially delineated in a second binary mask, which may be a binary valued mask with one (1) for each pixel of the background regions and zero (0) for each pixel outside the background regions.

Figure 2A:
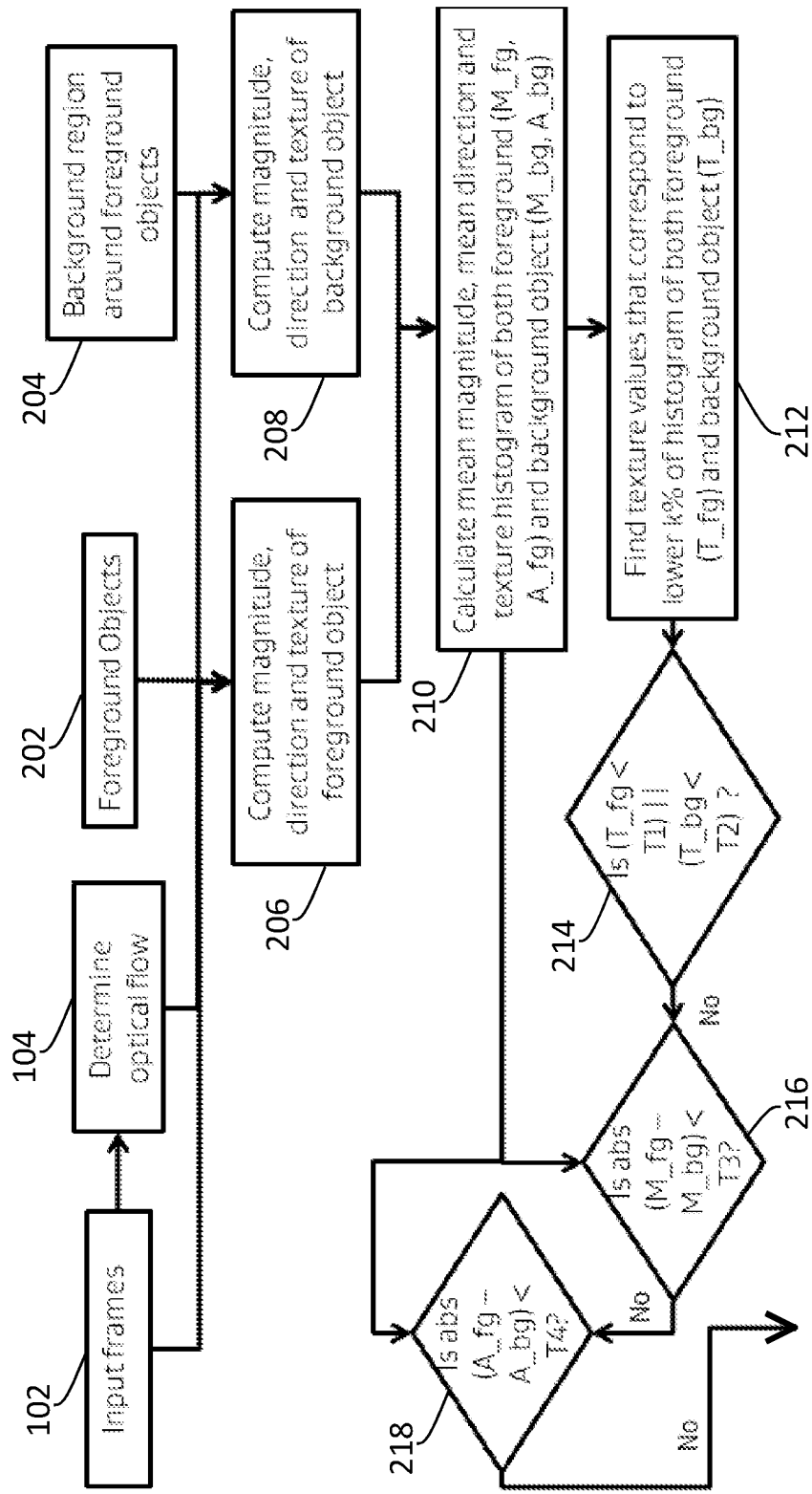
FIG. 2A and FIG. 2B illustrate example process flows that can be used to determine whether motion dragging artifacts are likely to be generated in a set of images.
Figure 2B:
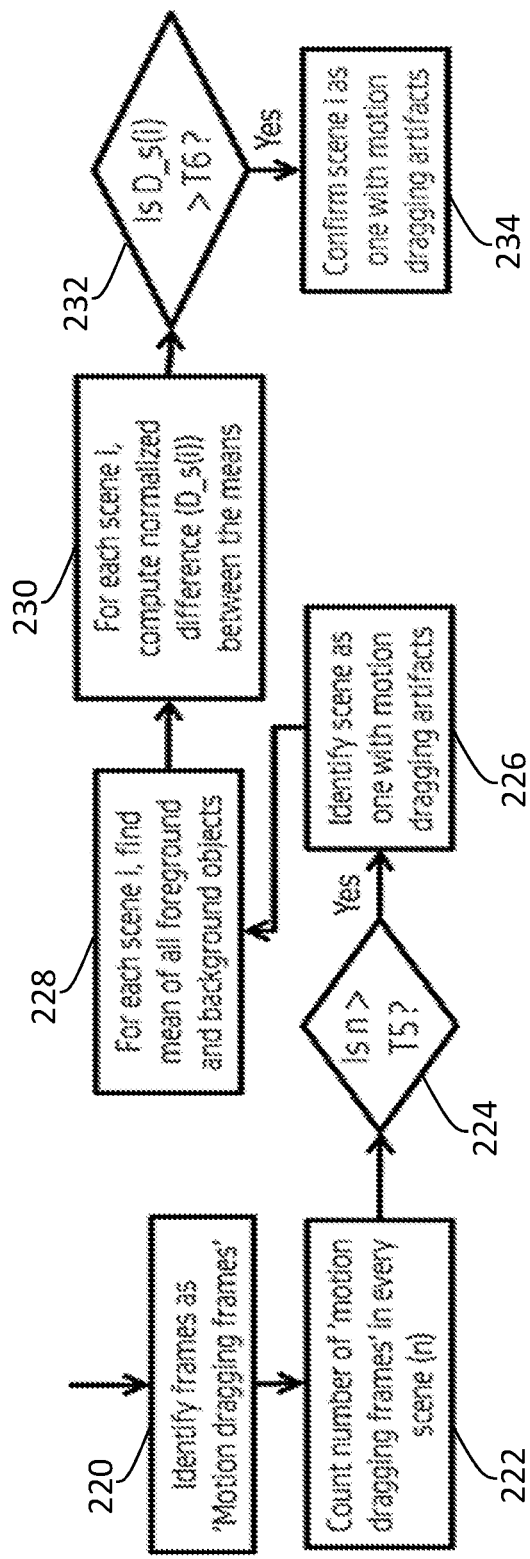

FIG. 2A and FIG. 2B illustrate example process flows that can be used to determine whether motion dragging artifacts are likely to be generated in a set of images (e.g., a subdivision of a scene, a single scene, multiple scenes, a single GOP, multiple GOPs, etc.). In some embodiments, one or more computing devices or components (e.g., an encoding device/module, a transcoding device/module, a decoding device/module, a media device/module, etc.) may perform this process flow.

In block 102 of FIG. 2A (which may be the same as block 102 in FIG. 1), an image processing system receives an image sequence comprising one or more sets of images ("input frames") that support an input frame rate. Each set of images may comprise two or more adjacent images along a common time reference represented in the image sequence.

In block 104 (which may be the same as blocks 104 and 106 in FIG. 1), the image processing system calculates an optical flow in two or more adjacent images in a set of images in the one or more sets of images and generates an optical flow field to represent the optical flow in the adjacent images. Subsequently, based on the optical flow field, a number of image morphological operations such as illustrated in FIG. 1 can be performed to generate a first binary mask to identify (e.g., flood filled, etc.) foreground objects 202 in a given image in the set of images and a second binary mask to identify background regions 204 that surround or border the foreground objects. In some embodiments, these morphological operations may act at an individual pixel level, at an individual pixel sub-block level, at an individual pixel block level, etc. Example morphological operations may include, but are not necessarily limited to only, any of: erosion operations, dilation operations, opening operations, closing operations, etc.

In blocks 206 and 208, the image processing system calculates or determines initial (e.g., per-pixel, per-pixel-block, etc.) motion characteristics in the image. Example motion characteristics may be, without limitation, motion vector magnitudes, motion vector directions, and so forth. In some embodiments, the optical flows in the image that have been computed in blocks 104 and 106 of FIG. 1 and FIG. 2A can be used to determine or compute the initial (e.g., per-pixel, per-pixel-block, etc.) motion characteristics such as motion vector magnitudes, motion vector directions, etc., in the image.

In block 210, the image processing system uses the initial (e.g., per-pixel, per-pixel-block, etc.) motion characteristics in the image to calculate or determine overall motion characteristics of each of the foreground objects (202) and overall motion characteristics of each of the background regions (204).

The first binary mask that spatially delineated each of the foreground objects can be applied to the initial (e.g., per-pixel, per-pixel-block, etc.) motion characteristics of the image to obtain a spatial distribution of initial (e.g., per-pixel, per-pixel-block, etc.) motion characteristics in each of the foreground objects (202).

Likewise, the second binary mask that spatially delineated each of the background regions can be applied to the initial (e.g., per-pixel, per-pixel-block, etc.) motion characteristics of the image to obtain a spatial distribution of initial (e.g., per-pixel, per-pixel-block, etc.) motion characteristics in each of the background regions (204).

In some embodiments, the image processing system uses the spatial distribution of initial (e.g., per-pixel, per-pixel-block, etc.) motion characteristics in each of the foreground objects (202) to generate a histogram of per-pixel texture values for each such foreground object. Outliers in the histogram such as initial (e.g., per-pixel, per-pixel-block, etc.) motion characteristics above a initial (e.g., per-pixel, per-pixel-block, etc.) motion characteristic threshold for foreground objects may be removed from the spatial distribution of initial (e.g., per-pixel, per-pixel-block, etc.) motion characteristics in each such foreground object. The initial (e.g., per-pixel, per-pixel-block, etc.) motion characteristic threshold for foreground objects may be set as an absolute value (e.g., a specific entropy value, etc.) or a relative value such as a percentile value (e.g., k %, 95%, 90%, etc.) among histogram bins of the histogram. An overall motion vector magnitude (denoted as "M_fg") of the foreground object, an overall motion vector direction (denoted as "A_fg") of the foreground object, etc., may be computed (e.g., as a group value, as a mean value, as an average value, as a medium value, as a mode value, etc.) from the spatial distribution of initial (e.g., per-pixel, per-pixel-block, etc.) motion characteristics in the foreground object (e.g., after outliers are removed from the spatial distribution, etc.).

Additionally, optionally or alternatively, the image processing system uses the spatial distribution of initial (e.g., per-pixel, per-pixel-block, etc.) motion characteristics in each of the background regions (204) to generate a histogram of initial (e.g., per-pixel, per-pixel-block, etc.) motion characteristics for each such background region. Outliers in the histogram such as initial (e.g., per-pixel, per-pixel-block, etc.) motion characteristics above a initial (e.g., per-pixel, per-pixel-block, etc.) motion characteristic threshold for background regions may be removed from the spatial distribution of initial (e.g., per-pixel, per-pixel-block, etc.) motion characteristics in each such background region. The initial (e.g., per-pixel, per-pixel-block, etc.) motion characteristic threshold for background regions may be set as an absolute value (e.g., a specific entropy value, etc.) or a relative value such as a percentile value (e.g., k %, 95%, 90%, etc.) among histogram bins of the histogram. An overall motion vector magnitude (denoted as "M_bg") of the background region, an overall motion vector direction (denoted as "A_bg") of the background region, etc., may be computed (e.g., as a group value, as a mean value, as an average value, as a medium value, as a mode value, etc.) from the spatial distribution of initial (e.g., per-pixel, per-pixel-block, etc.) motion characteristics in the background region (e.g., after outliers are removed from the spatial distribution, etc.).

In block 212, the image processing system calculates or determines an overall texture of each of the foreground objects (202) and an overall texture of each of the background regions (204).

In some embodiments, a (e.g., per-pixel, per-pixel-block, etc.) texture of the entire image may be first calculated or determined. The texture of the image may be generated by calculating an entropy value of the local neighborhood for each pixel or pixel block of the image. The texture of the image may be represented by a spatial distribution of (e.g., per-pixel, per-pixel-block, etc.) texture value, such as a spatial distribution of (e.g., per-pixel, per-pixel-block, etc.) entropy values, in the image.

Subsequently, the first binary mask that spatially delineated each of the foreground objects can be applied to the texture of the image to obtain a spatial distribution of (e.g., per-pixel, per-pixel-block, etc.) texture values in each of the foreground objects (202).

Likewise, the second binary mask that spatially delineated each of the background regions can be applied to the texture of the image to obtain a spatial distribution of (e.g., per-pixel, per-pixel-block, etc.) texture values in each of the background regions (204).

In some embodiments, the image processing system uses the spatial distribution of (e.g., per-pixel, per-pixel-block, etc.) texture values in each of the foreground objects (202) to generate a histogram of (e.g., per-pixel, per-pixel-block, etc.) texture values for each such foreground object. Outliers in the histogram such as texture values above a texture value threshold for foreground objects may be removed from the spatial distribution of (e.g., per-pixel, per-pixel-block, etc.) texture values in each such foreground object. The texture value threshold for foreground objects may be set as an absolute value (e.g., a specific entropy value, etc.) or a relative value such as a percentile value (e.g., k %, 95%, 90%, etc.) among histogram bins of the histogram. Removing the outliers from the spatial distribution of (e.g., per-pixel, per-pixel-block, etc.) texture values in the foreground object essentially eliminates or substantially reduces the influence of edges that might be present in the foreground object and prevent the outliers from being included in computing an overall texture value for the foreground object, as edges in the image typically results in relatively high entropy values, which may artificially boost the per-pixel texture values in the foreground object. An overall texture value (denoted as "T_fg") of the foreground object may be computed (e.g., as a group value, as a mean value, as an average value, as a medium value, as a mode value, etc.) from the spatial distribution of (e.g., per-pixel, per-pixel-block, etc.) texture values in the foreground object (e.g., after outliers are removed from the spatial distribution, etc.).

Additionally, optionally or alternatively, the image processing system uses the spatial distribution of (e.g., per-pixel, per-pixel-block, etc.) texture values in each of the background regions (204) to generate a histogram of (e.g., per-pixel, per-pixel-block, etc.) texture values for each such background region. Outliers in the histogram such as texture values above a per-pixel texture value threshold for background regions may be removed from the spatial distribution of (e.g., per-pixel, per-pixel-block, etc.) texture values in each such background region. The texture value threshold for background regions may be set as an absolute value (e.g., a specific entropy value, etc.) or a relative value such as a percentile value (e.g., k %, 95%, 90%, etc.) among histogram bins of the histogram. Removing the outliers from the spatial distribution of (e.g., per-pixel, per-pixel-block, etc.) texture values in the background region essentially eliminates or substantially reduces the influence of edges that might be present in the background region and prevent the outliers from being included in computing an overall texture value for the background region, as edges in the image typically results in relatively high entropy values, which may artificially boost the (e.g., per-pixel, per-pixel-block, etc.) texture values in the background region. An overall texture value (denoted as "T_bg") of the background region may be computed (e.g., as a group value, as a mean value, as an average value, as a medium value, as a mode value, etc.) from the spatial distribution of (e.g., per-pixel, per-pixel-block, etc.) texture values in the background region (e.g., after outliers are removed from the spatial distribution, etc.).

In some embodiments, the image processing system performs a number of tests, based at least in part on the motion characteristics and texture information, to predict if motion dragging artifacts are likely to occur in the image or in the set of images (e.g., a subdivision of a scene, a single scene, multiple scenes, a single GOP, multiple GOPs, etc.) with image interpolation.

For example, as one of the tests, in block 214, the image processing system determines whether an overall texture value "T_fg" of each foreground object, among the (flood-filled) foreground objects, is above an overall texture value threshold (denoted as "T1") for foreground objects. If the overall texture value "T_fg" of the foreground object is more than the overall texture value threshold "T1" for foreground objects, the foreground object may be considered as not smooth. On the other hand, if the overall texture value "T_fg" of the foreground object is no more than the overall texture value threshold "T1" for foreground objects, the foreground object may be considered as smooth.

The image processing system also determines whether an overall texture value "T_bg" of a background region that surrounds or borders the foreground object is above an overall texture value threshold (denoted as "T2") for background regions. If the overall texture value "T_bg" of the background region is more than the overall texture value threshold "T2" for background regions, the background region may be considered as not smooth. On the other hand, if the overall texture value "T_bg" of the background region is no more than the overall texture value threshold "T2" for background regions, the background region may be considered as smooth.

Smoothness or non-smoothness of the foreground objects and the background region can be used as one of the factors to determine whether motion dragging is likely to occur in the image or in the set of image with image interpolation, as it may be difficult to observe motion dragging artifacts if both the foreground object and the background region surrounding/bordering the foreground object are smooth.

Hence the image processing system may determine that motion dragging artifacts possibly exist in the background region that surrounds or borders the foreground object, in response to determining either that the overall texture value "T_fg" of the foreground object is above an overall texture value threshold "T1" for foreground objects or that the overall texture value "T_bg" of the background region is above an overall texture value threshold "T2" for background regions.

In blocks 216 and 218, the image processing system performs one or more tests to determine whether there are sufficiently large differences in the overall motion vector magnitudes and in the overall motion vector directions between (an overall motion vector of) the foreground object and (an overall motion vector of) the background region. An overall motion vector of a set of pixels such as an overall motion vector of a foreground object or the background region may be computed (e.g., as a weighted or unweighted vector average, etc.) based on individual motion vectors of pixels or pixel blocks in the set of pixels.

More specifically, in block 216, the image processing system determines whether an absolute value of the difference between the overall motion vector magnitude "M_fg" of the foreground object and the overall motion vector magnitude "M_bg" of the background region is above an overall motion vector magnitude threshold (denoted as "T3"). The image processing system may determine that motion dragging artifacts possibly exist in the background region that surrounds or borders the foreground object in derived images interpolated from the image or the set of images, in response to determining the absolute value of the difference between the overall motion vector magnitude "M_fg" of the foreground object and the overall motion vector magnitude "M_bg" of the background region is above the overall motion vector magnitude threshold (denoted as "T3"). On the other hand, the image processing system may determine that motion dragging artifacts are not likely to exist in the background region that surrounds or borders the foreground object in derived images interpolated from the image or the set of images, in response to determining the absolute value of the difference between the overall motion vector magnitude "M_fg" of the foreground object and the overall motion vector magnitude "M_bg" of the background region is no more than the overall motion vector magnitude threshold (denoted as "T3").

In block 218, the image processing system also determines whether an absolute value of the difference between the overall motion vector direction "A_fg" of the foreground object and the overall motion vector direction "A_bg" of the background region is above an overall motion vector direction threshold (denoted as "T4"). The image processing system may determine that motion dragging artifacts possibly exist in the background region that surrounds or borders the foreground object in derived images interpolated from the image or the set of images, in response to determining the absolute value of the difference between the overall motion vector direction "A_fg" of the foreground object and the overall motion vector direction "A_bg" of the background region is above the overall motion vector direction threshold (denoted as "T4"). On the other hand, the image processing system may determine that motion dragging artifacts are not likely to exist in the background region that surrounds or borders the foreground object in derived images interpolated from the image or the set of images, in response to determining the absolute value of the difference between the overall motion vector direction "A_fg" of the foreground object and the overall motion vector direction "A_bg" of the background region is no more than the overall motion vector direction threshold (denoted as "T4").

In response to determining that (e.g., all of, etc.) these tests such as performed in blocks 214, 216 and 218 indicate that motion dragging artifacts are possible in any foreground object and its corresponding surrounding/bordering background region in derived images interpolated from the image or the set of images the image, the image processing system determines that motion dragging artifacts are likely to exist in the image with image interpolation. The image processing system can proceed to identify the image to be a candidate image in the set of images to have motion dragging artifacts with image interpolation.

On the other hand, in response to determining that (e.g., any of, etc.) these tests such as performed in blocks 214, 216 and 218 indicate that motion dragging artifacts are not possible in all foreground objects and their corresponding surrounding/bordering background regions in derived images interpolated from the image or the set of images, the image processing system determines that motion dragging artifacts are not likely to exist in derived images interpolated from the image or the set of images. The image processing system can identify the image as safe from image interpolation and avoid identify the image to be a candidate image in the set of images to have motion dragging artifacts with image interpolation.

For some or all images in the set of images, the foregoing processing blocks in FIG. 2A may be repeated to identify a subset of images as candidate images in response to determining that motion dragging artifacts are likely to occur in each image in the subset of images. The process flows then proceeds to block 220 of FIG. 2B, which illustrates example subsequent processing blocks that are continued from the process flow of FIG. 2A.

In block 220 of FIG. 2B, the image processing system identifies all candidate images in each scene among one or more scenes depicted by the set of images.

In blocks 222 and 224, the imaging processing system counts all such candidate frames in each such scene to generate a total number of candidate frames in each such scene, and determines whether the total number of candidate frames exceeds a motion dragging frame count threshold (denoted as "T5").

In block 226, the image processing system identifies each scene in the scenes depicted by the set of images as a candidate scene to have motion dragging artifacts with image interpolation in response to determining that a total number of candidate frames in each such scene exceeds the motion dragging frame count threshold "T5".

In block 228, the image processing system performs a pruning process for all the candidate scenes that have been identified by the foregoing processing blocks up to block 226. For each candidate scene (indexed by "i") among all the candidate scenes, the image processing device first identifies all the images in the candidate scene. Then, for each image in the candidate scene, the image processing device computes or determines a per-image (e.g., mean, etc.) optical flow (or motion vector) magnitude of one or more foreground objects (the image may contain a single foreground object or multiple foreground objects depending on image content in the image) in the image as well as a per-image (e.g., mean, etc.) optical flow (or motion vector) magnitude of background regions surrounding or bordering the one or more foreground objects in the image. From per-image optical flow magnitudes of the foreground objects and of the background regions in each image in some or all images of the candidate scene, the image processing device computes or determines a per-scene (e.g., mean, etc.) optical flow (or motion vector) magnitude of the foreground objects in the candidate scene as well as a per-scene (e.g., mean, etc.) optical flow (or motion vector) magnitude of background regions surrounding or bordering the foreground objects in the same candidate scene.

In block 230, for each candidate scene (indexed by "i") among all the candidate scenes identified from the scenes depicted by the set of images, the image processing system determines or computes an optical flow magnitude difference (denoted as "D_s(i)") between a per-scene (e.g., mean, etc.) optical flow (or motion vector) magnitude of foreground objects in the candidate scene as well as a per-scene (e.g., mean, etc.) optical flow (or motion vector) magnitude of background regions surrounding or bordering the foreground objects in the same candidate scene. In some embodiments, an optical flow magnitude difference as described herein may be computed as an absolute value, or alternatively as a signed value.

In some embodiments, an individual optical flow magnitude difference "D_s(i)" for each (individual) candidate scene among all the candidate scenes is normalized by the maximum optical flow magnitude difference among all individual optical flow magnitude differences of all the candidate scene.

In block 232, for each candidate scene (indexed by "i") among all the candidate scenes identified from the scenes depicted by the set of images, the image processing system determines whether an (individual) optical flow magnitude difference "D_s(i)" (e.g., as normalized, etc.) for each such candidate scene exceeds a per-scene optical flow magnitude threshold (denoted as "T6").

In block 234, the image processing system identifies or confirms the candidate scene as a motion-dragging-artifact scene in response to determining that the optical flow magnitude difference "D_s(i)" (e.g., as normalized, etc.) for the candidate scene exceeds the per-scene optical flow magnitude threshold "T6". Otherwise, the image processing system avoids identifying or confirming the candidate scene as a motion-dragging-artifact scene.

In some embodiments, some or all of the foregoing operations may be performed with respect to a currently decoded, processed and/or designated set of images (a current set of images). The image processing system may repeat the foregoing operations for other received sets of images.

By varying individual values for different thresholds (e.g., "T1" through "T6", etc.) in processing flows such as illustrated in FIG. 2A and FIG. 2B, an image processing system as described herein can identify motion dragging artifacts of different strengths (e.g., different severities, different confidence levels, etc.). This knowledge about the motion dragging artifacts of different strengths in image content can in turn be used to guide the setting of operations modes for FRC. In a non-limiting example in which a viewer does not prefer seeing motion dragging artifacts around a very fast-moving object in a background with lots of texture, then the thresholds in the processing flows can be set so that FRC is turned OFF for scenes in which very fast-moving objects (e.g., above a motion vector magnitude threshold for very fast-moving objects, etc.) are detected. In another non-limiting example in which another viewer does not prefer seeing motion dragging artifacts around a relatively slow-moving object, the thresholds can be set so that FRC is turned OFF for scenes in which relatively slow-moving objects (e.g., above a minimum motion vector magnitude threshold but below a maximum motion vector magnitude threshold for relatively slow-moving objects, etc.) are detected.

For the purpose of illustration only, it has been described that FRC related operational modes supported by techniques as described herein include an FRC OFF mode, an FRC HIGH mode, an FRC MED mode, and an FRC LOW mode. It should be noted that in various embodiments, more or fewer FRC related operational modes may be determined and used per spatial region, per image, per scene, etc., based on FRC-related analyses on image content in an image, in a GOP, in a scene, in multiple scenes, etc. Additionally, optionally or alternatively, it should be noted that in various embodiments, more or fewer FRC related operational modes may be supported by a display system on which the image or the set of images is to be rendered. In an example, in some embodiments, the FRC related modes supported by techniques as described herein may include only an FRC OFF mode and an FRC ON mode. In another example, in some embodiments, the FRC related modes supported by techniques as described herein may include only an FRC OFF mode, an FRC HIGH mode, and an FRC LOW mode. In yet another example, in some embodiments, the FRC related modes supported by techniques as described herein may include additional FRC related modes in addition to an FRC OFF mode, an FRC HIGH mode, an FRC MED mode, and an FRC LOW mode.

In some embodiments, an upstream device (e.g., a video encoder, a studio-based system, a broadcast system, a media streaming server, a cloud-based system, a set-top box, a sync device, etc.) may identify scenes prone to motion dragging artifacts in an image sequence comprising sets of images in a media program before transmitting the images to downstream devices, for example in a pre-computing stage (e.g., offline, during encoding, before encoding, etc.). In some embodiments, the upstream device determines an optimal FRC operational mode per image. Additionally, optionally, or alternatively, in some embodiments, the upstream device determines or maintains an optimal (constant) FRC operational mode for an entire scene comprising multiple (e.g., consecutive, sequential, etc.) images; changes in FRC operational modes may be allowed to occur only at scene cuts or scene boundaries between two different adjacent scenes (or at the beginning of a media program comprising the scenes).

The upstream device may compute only a single value (e.g., a single-valued FRC flag, etc.) representing a probability value for motion dragging artifacts in image interpolation/rendering to occur per image, per scene, etc. Additionally, optionally, or alternatively, the upstream device may compute a multi-valued factor (e.g., a multi-valued FRC flag, etc.) per image, per scene, etc. By way of example but not limitation, the multi-valued factor may comprise multiple probability values for motion dragging artifacts of different strengths to occur.

In some embodiments, the image metadata may include an FRC flag, an FRC data field, etc., that can directly or indirectly indicate whether a particular FRC operational mode such as an FRC OFF mode, an FRC HIGH mode, an FRC LOW mode, an FRC intermediate mode, etc., is to be used by a downstream device and/or a display device operating in conjunction with the downstream device for a given set of images.

In some embodiments, the image metadata includes an FRC flag for each image to indicate the best FRC operational mode for the image. In various embodiments, a downstream device may implement an algorithm to set FRC operational modes per image, per scene, per GOP, per fixed number of images, etc. For example, the downstream device may set a particular FRC operational mode for a set of images in response to determining that a plurality of images (e.g., exceeding a certain threshold number, etc.) in the set of images has the particular FRC operational mode predetermined (e.g., through a per-image flag, etc.) at the encoder side as the best FRC operational mode.

In some embodiments, the image metadata includes an FRC flag (e.g., the single-valued FRC flag, etc.) for each set of images (e.g., representing a scene, etc.) to indicate the best FRC operational mode for the set of images. The downstream device may set a particular FRC operational mode for the set of images in response to determining that the set of images has the particular FRC operational mode predetermined (e.g., through a per-image flag, etc.) at the encoder side as the best FRC operational mode.

In some embodiments, instead of or in addition to generating the image metadata that explicitly determines/sets the best FRC operational modes, the upstream device may generate one or more portions of the image metadata that can be used to guide downstream devices to select the best FRC operational mode among various FRC operational modes respectively implemented by different downstream devices. For example, the image metadata may comprise a FRC data field or flag per image, per scene, per GOP, etc., to indicate one or more of: a binary mask delineating foreground objects, a binary mask delineating background regions, strengths for motion dragging artifacts to occur with image interpolation in any some or all of the background regions, etc.

The image metadata may be used by a downstream device to guide its own selection of the best FRC operational mode among a plurality FRC operational modes implemented by the downstream device or a display device operating in conjunction with the downstream device in an image or a spatial region thereof, in a GOP, in a scene, etc.

The image metadata can be generated in real time, in offline processing, time-delay processing, etc. The image metadata may be included in one or more media data bitstreams that are used to transmit the images to the downstream devices.

In some embodiments, some or all of the image metadata may be generated based at least in part on the knowledge of future images relative to one or more currently decoded, processed and/or designated images, where the future images are available, for example, as a part of a non-live media program, as a part of offline processing of a media program, in a peek-ahead buffer of a live or non-live media program, etc.

In some embodiments, a downstream device (e.g., a set-top box, a TV, a mobile device, a tablet computer, a laptop computer, a PC, a sync device, etc.) may receive the image sequence comprising the sets of images in the media program with the image metadata generated by the upstream device.

For example, in a decoding/playback stage (e.g., in a television, in a set-top box, a sync device, etc.), the downstream device read or decode the image metadata that is encoded and carried in one or more media data bitstreams from which the sets of images can be decoded. Based at least in part on the image metadata, the downstream device can decide on the best FRC operational mode (or the best FRC settings). In some embodiments, the downstream device can decide on the best FRC operational mode (or the best FRC settings) further based on FRC capabilities of the downstream device and/or a display device operating in conjunction with the downstream device. For example, the downstream device and/or the display device may have relatively strong FRC capabilities in interpolating translational motions, but relatively weak FRC capabilities in interpolating rotational motions. In response to determining that the image metadata indicates relatively predominant translational motions of foreground objects or background regions in an image, in a scene, etc., the downstream device and/or the display device may set a FRC HIGH or FRC MED as the best FRC operational mode for the image, for the scene, etc. On the other hand, in response to determining that the image metadata indicates relatively predominant rotational motions of foreground objects or background regions in an image, in a scene, etc., the downstream device and/or the display device may set a FRC LOW or even FRC OFF as the best FRC operational mode for the image, for the scene, etc.

Using the image metadata generated at the encoder side, the downstream device can avoid or reduce buffering the images and analyzing the images to determine the likelihoods for motion dragging artifacts to occur with image interpolation/rendering at the decoder side, thereby significantly avoiding or reducing delays in rendering the images. Image metadata can be used in a flexible manner in various embodiments. For example, in some embodiments, the image metadata including but not limited to the size/amount of metadata overheads may be specifically optimized for deploying to one or more of: particular FRC related frameworks, particular platforms, particular manufacturers/vendors, particular types of display devices and/or computing devices, etc. In some other embodiments, the image metadata may be encoded and decoded based on standards, proprietary specifications, enhancements to standards and/or proprietary specifications, etc., and may be deployed to a wide variety of FRC related frameworks, platforms, manufacturers, vendors, types of display devices and/or computing devices, etc.

Additionally, optionally, or alternatively, a downstream device may be configured to perform adaptive operations to adapt the image metadata for optimally selecting/determining optimal FRC operational modes (or optimal FRC settings) for images to be rendered with the downstream device. For example, the image metadata may include one or more metadata portions that specify, or that can be used to determine, a set of more or fewer FRC operational modes than device-specific FRC operational modes actually implemented with the downstream device or with a display device operating in conjunction with the downstream device. The downstream device and/or the display device may be configured to map the FRC operational modes in the set that can be specified/determined based on the image metadata to the device-specific FRC operational modes.

In some embodiments, the image metadata may include one or more metadata portions that specify, or that can be used to determine, multiple sets of FRC operational modes and/or multiple sets of FRC operational parameters. Each of the multiple sets of FRC operational modes and/or the multiple sets of FRC operational parameters may be applicable to one or more of: respective FRC related frameworks, respective platforms, respective manufacturers/vendors, particular types of display devices and/or computing devices, etc. The downstream device or with a display device operating in conjunction with the downstream device may be configured to select a particular set of FRC operational modes from the multiple sets of FRC operational modes and/or a particular set of FRC operational parameters from the multiple sets of FRC operational parameters that is appropriate to the downstream device and/or the display device, for example, based on FRC capabilities of the downstream device and/or the display device.

In some embodiments, different FRC operational modes may be selected or determined for different spatial regions of images. A spatial region as described herein may refer to a set of contiguous pixels in (e.g., a frame of, etc.) an image. For example, an image processing system as described herein may be configured to partition/segment an image (or two or more adjacent images) into one or more spatial regions based on binary masks delineating foreground objects and background regions. In some embodiments, the one or more spatial regions collectively span an entire image.

Different likelihoods/probabilities for motion dragging artifacts to occur with image interpolation/rendering in the different spatial regions may be determined. In an example, relatively high likelihood/probability may be detected in a first portion of the image, whereas relatively low likelihood/probability may be detected in a second portion of the image. In some embodiments, techniques as described herein may be applied at a spatial region level. In some embodiments, instead of applying a single FRC operational mode (or FRC settings), multiple different FRC operational modes may be selected or determined for an image or different spatial regions therein.

In some embodiments, other types of image metadata can be generated by upstream devices (e.g., video encoding devices, etc.) to guide operations in downstream devices (e.g., video decoding devices, etc.). As foreground objects are identified in images, background regions (not necessarily limited to only those where motion dragging artifacts are likely to occur with image interpolation) that separate or surround the foreground objects can also be identified in the images. Image metadata that carries or signals one or more semantic meanings such as scene types (e.g., police chase, skiing, boating, etc.), types (e.g., trains, cars, airplanes, ships, runners, pedestrians, etc.) of foreground objects, types (e.g., mountains, sky, waters, crowds, flows of cars, etc.) of background regions, motion/texture information (e.g., diffusive reflections, specular reflections, light sources, skins, faces, etc.) about the foreground objects, motion/texture information (e.g., diffusive reflections, specular reflections, light sources, skins, faces, etc.) about the background regions, etc. The semantic meanings carried or signaled by the image metadata can then be used by a recipient device (e.g., a video decoder, a set-top box, a video transcoder, a display system, a sync device, etc.) to guide setting various modes for FRC.

By way of illustration but not limitation, enhancement sensitivity metadata may be used to indicate sensitivity levels for image enhancement operation (e.g., color enhancement, saturation boosting, etc.) in an image or a spatial region thereof, in a scene, etc., in order to guide application of the image enhancement operations implemented in downstream devices or display devices operating in conjunction with the downstream devices.

For images or spatial regions therein that are sensitive to visual artifacts (e.g., unnatural skin color tone, etc.) caused by applying any given image enhancement operation, the enhancement sensitivity metadata can be generated by an upstream device and used by downstream devices to avoid the application or reduce the strength of the image enhancement operation for the purpose of avoiding or reducing these visual artifacts in images that are prone to generating these visual artifacts if the application or the strength (e.g., set by a user, set by default, set programmatically, set without the benefit of the enhancement sensitivity metadata, etc.) of the image enhancement operation were maintained or applied.

In a pre-computing stage (e.g., offline, during encoding, before encoding, etc.), the upstream device may determine sensitivity levels for image enhancement operations in the image sequence and generate enhancement sensitivity metadata for the image sequence based on the sensitivity levels determined in the image sequence. The enhancement sensitivity metadata may indicate a relatively high sensitivity for saturation boosting because of a presence of sensitive skin tones in an image or a portion thereof. If there are sensitive skin tones, then the downstream device can turn off the application or reduce the strength of color enhancement algorithms performed in the downstream device or in a display device operating in conjunction with the downstream device.

For example, by separating foreground objects from background regions in images, salient regions of the images can be identified (e.g., as some or all of the foreground regions, etc.). Different spatial region-specific processing can be performed on the salient regions of the images, as compared with (e.g., remaining, etc.) non-salient regions of the images. The enhancement sensitivity metadata in the image metadata may be generated to drive or cause different levels of image enhancement to be performed for different regions of the images. Example image enhancement includes, but is not necessarily limited to only, boosting saturation, color enhancement, etc., of the images or specific regions thereof. The enhancement sensitivity metadata in the image metadata can indicate whether any, some or all of the foreground objects are sensitive to color enhancement. For instance, in response to determining that a foreground object represents a human face, then an image processing system as described herein can generate enhancement sensitivity metadata to indicate that a spatial region with the foreground object comprises sensitive skin tones, and/or that the strength of saturation boosting, color enhancement, and so forth, for the spatial region is to be reduced when the images are rendered.

The enhancement sensitivity metadata can be generated in real time, in offline processing, time-delay processing, etc. The sensitivity level metadata may be included by (e.g., as a part of, as supplemental metadata to, etc.) overall image metadata embedded (e.g., as sub-bitstreams, as one or more data fields, as one or more flags, etc.) in one or more media data bitstreams that are used to transmit the images to the downstream devices.

In some embodiments, a downstream device (e.g., a set-top box, a TV, a mobile device, a tablet computer, a laptop computer, a PC, a sync device, etc.) may receive the image sequence comprising the sets of images in the media program with the enhancement sensitivity metadata generated by the upstream device.

In some embodiments, the downstream device may be freed from performing some or all of the operations used to determine the sensitivity levels for image enhancement operations in the sets of images in the media program after receiving the images directly or indirectly from the upstream device.

For example, in a decoding/playback stage (e.g., in a television, in a set-top box, in a sync device, etc.), the downstream device read or decode the sensitivity levels (for the image sequence) for image enhancement operations from the enhancement sensitivity metadata that is encoded and carried in one or more media data bitstreams from which the sets of images can be decoded. Based at least in part on the decoded sensitivity levels, the downstream device can decide on whether some or all of the image enhancement operations should be applied or how much the strength of the image enhancement operations is to be applied. In response to determining that a sensitivity level for a given image enhancement operation in one or more images indicate the image enhancement operation should not be applied, the downstream device and/or the display device may turn off the image enhancement operation for these images. On the other hand, in response to determining that the sensitivity level for the image enhancement operation in the one or more images indicates the image enhancement operation should be applied, the downstream device and/or the display device may turn on the image enhancement operation for these images. Additionally, optionally, or alternatively, the downstream device and/or the display device may further determine a strength of the image enhancement operation to be applied to these images based on the enhancement sensitivity metadata.

In some embodiments, different image enhancement operations, different strengths of same image enhancement operations, etc., can be applied to different spatial regions of images. For example, an image processing system as described herein may be configured to partition/segment an image (or two or more adjacent images) into one or more spatial regions based on respective sensitive levels for image enhancement operations in the one or more spatial regions of the image (or the two or more adjacent images). The one or more spatial regions may or may not collectively span an entire image. Thus, in some embodiments, image enhancement techniques as described herein may be applied at a spatial region level.

In some embodiments, noise level metadata can be generated by upstream devices to indicate a level of noise in an image or a spatial region thereof, in a scene, etc., in order to guide application of sharpening filters, a noise reduction filters, etc., implemented in downstream devices or display devices operating in conjunction with the downstream devices. For images or spatial regions therein that are sensitive to visual artifacts (e.g., halos, noises, etc.) caused by applying a sharpening filter, a noise reduction filter, etc., noise level metadata can be generated by an upstream device and used by downstream devices to avoid the application or reduce the strength of the sharpening filter, the noise reduction filter, etc., for the purpose of avoiding or reducing these visual artifacts in images that are prone to generating these visual artifacts if the application or the strength (e.g., set by a user, set by default, set programmatically, set without the benefit of the noise level metadata, etc.) of the sharpening filter, the noise reduction filter, etc., were maintained or applied.

For example, in a pre-computing stage (e.g., offline, during encoding, before encoding, etc.), the upstream device may determine noise levels in the image sequence and generate noise level metadata for the image sequence based on the noise levels determined in the image sequence. The noise level metadata in the image metadata may be generated to drive or cause different levels of noise reduction, noise injection, and so forth, to be performed for different regions of the images. The noise level metadata in the image metadata can indicate whether any, some or all of foreground objects and background regions do not need noise reduction, noise injection, and so forth. In an example, in response to determining that a foreground object represents a human face, then an image processing system as described herein can generate noise level metadata to selectively guide sharpening filtering in display systems in order to accentuate the foreground object. In another example, in response to determining that low noise levels exist in textures of background regions, then an image processing system as described herein can generate noise level metadata to prevent unnecessary noise injection into the textures of the background regions. In yet another example, in response to determining that high noise levels already exist in textures of foreground objects, then an image processing system as described herein can generate noise level metadata to prevent unnecessary noise injection into the textures of the foreground objects.

The noise level metadata can be generated in real time, in offline processing, time-delay processing, etc. The noise level metadata may be included by (e.g., as a part of, as supplemental metadata to, etc.) overall image metadata embedded (e.g., as sub-bitstreams, as one or more data fields, as one or more flags, etc.) in one or more media data bitstreams that are used to transmit the images to the downstream devices.

In some embodiments, a downstream device (e.g., a set-top box, a TV, a mobile device, a tablet computer, a laptop computer, a PC, a sync device, etc.) may receive the image sequence comprising the sets of images in the media program with the noise level metadata generated by the upstream device.

In some embodiments, the downstream device may be freed from performing some or all of the operations used to determine the noise levels in the sets of images in the media program after receiving the images directly or indirectly from the upstream device.

For example, in a decoding/playback stage (e.g., in a television, in a set-top box, a sync device, etc.), the downstream device read or decode the noise levels (for the image sequence) from the noise level metadata that is encoded and carried in one or more media data bitstreams from which the sets of images can be decoded. Based at least in part on the decoded noise levels, the downstream device can decide on whether a sharpening filter, a noise reduction filter, etc., is to be applied or how much the strength of such filtering is to be applied. In response to determining that the noise levels for one or more images indicate the sharpening filter, the noise reduction filter, etc., should not be applied, the downstream device and/or the display device may turn off the sharpening filter, the noise reduction filter, etc., for these images. On the other hand, in response to determining that the noise levels for one or more images indicate the sharpening filter, the noise reduction filter, etc., should not be applied, the downstream device and/or the display device may turn on the sharpening filter, the noise reduction filter, etc., for these images. Additionally, optionally, or alternatively, the downstream device and/or the display device may further determine a strength of the sharpening filter, the noise reduction filter, etc., to be applied to these images based on the noise level metadata.

In some embodiments, different sharpening operations/filters, different noise reduction operations/filters, different strengths of sharpening operations/filters, different strengths of noise reduction operations/filters, etc., can be applied to different spatial regions of images. For example, an image processing system as described herein may be configured to partition/segment an image (or two or more adjacent images) into one or more spatial regions based on respective noise levels in the one or more spatial regions of the image (or the two or more adjacent images). In some embodiments, the one or more spatial regions collectively span an entire image. In some embodiments, none of the one or more spatial regions may be non-overlapping. In some embodiments, at least two of the one or more spatial regions may overlap with each other. Thus, in some embodiments, sharpening and/or noise reduction techniques as described herein may be applied at a spatial region level.

Under techniques as described herein, any combination of one or more features pertaining to motion can be used to determine whether interpolating some or all of images in a set of images, or any spatial regions thereof, is likely/probable to introduce motion dragging artifacts, is likely/probable to have visual artifacts with noise processing operations, is likely/probable to have visual artifacts with image enhancement operations, and so forth. For example, any combination of one or more of: texture, optical flow (or motion vector) magnitude, optical flow (or motion vector) direction, etc., of foreground objects and/or background regions, can be used to determine these likelihoods or probabilities. Additionally, optionally or alternatively, a single feature—such as only one of: texture, optical flow (or motion vector) magnitude, optical flow (or motion vector) direction, etc., can be used to determine or calculate complexities of motions, likelihoods for various artifacts as related to various image processing operations, etc. in an image, a GOP, a scene, multiple scenes, and so forth.

In some embodiments, motion information at a different granularity other than a per-pixel granularity such as per-motion-block information, per-pixel-block motion information, etc., can be used to determine or calculate complexities of motions, likelihoods for various artifacts as related to various image processing operations, etc. in an image, a GOP, a scene, multiple scenes, and so forth.

For the purpose of illustration only, motion information about different pixels in any, some or all images in a set of images may be used to identify one or more foreground objects depicted in the images and to separate the foreground objects from background regions. Additionally, optionally or alternatively, different computer vision techniques other than optical flow-based may be used to identify foreground objects and background regions.

For instance, an image processing system may use one or more of: face detectors, shape detectors, object detectors, and so forth, to identify faces/person/objects in image content. Example object detectors may include, but are not necessarily limited to only, any of: generic or specialized object detectors such as generic or specialized face detectors, generic or specialized person detectors, generic or specialized car detectors, and so forth.

In some embodiments, an image processing system can use one or more different deep learning methods to identify different objects in the image content. The image processing system may use one or more different saliency techniques to identify salient regions in a given image or a given set of images. Additionally, optionally or alternatively, the image processing system can apply one or more different spatiotemporal video segmentation algorithms to identify foreground objects and background regions in a scene. Features identified by these and other techniques can be used by an image processing system to generate image metadata as described herein.

In some embodiments, an image processing system may receive or decode some or all of: motion information, complexities of motions, likelihoods for various artifacts as related to various image processing operations, etc. in an image, a GOP, a scene, multiple scenes, and so forth, from a coded bitstream encoded with input images, instead of computing some or all of these features based on the image processing system directly deriving motion information from image content or pixel values of the input images. By way of example but not limitation, in some embodiments, the image processing system extracts motion vectors from the coded bitstream, and performs a statistical analysis on the extracted motion vectors such as computing variance in the motion vectors to determine complexities of motions, likelihoods for various artifacts as related to various image processing operations, etc., in the image content decoded from the coded bitstream.

In addition to, or in place of, generating image metadata to guide, enable, disable or adjust the strength of motion interpolation operations/algorithms, other methods of adjusting the strength of motion interpolation operations/algorithms in a display system (e.g., a TV, etc.), a sync device, a client device, a streaming client, a set-top device, etc., may be used. In some embodiments, the final strength of the motion interpolation operations/algorithms may be set or determined based on a combination of image metadata (e.g., FRC-related metadata, enhancement sensitivity metadata, noise level metadata, etc.) and user references set or specified by a user or a viewer. By way of illustration but not limitation, the user preferences may be merged into a user preference value between zero (0) and one (1), with a value of zero indicating off or disabled, and one indicating a full strength. The image metadata (e.g., FRC-related metadata, etc.) can carry or signal a motion-related value indicating a complexity of motion in a scene, with a value of one (1) indicating simple motion, and zero (0) indicating complex motion. Any of these values can be vary on a per-image basis or on a per-scene basis, and may be smoothened or low pass filtered over time to prevent jarring or abrupt changes/thrashings in FRC settings such as motion interpolation settings.

Additionally, optionally or alternatively, an image processing system such as a display system, a set-top box, and so forth, can use user preferences to simulate or generate different user experiences. In an example, in response to determining that the user preferences indicate a preference for viewing motion judder in images (or a cinema-like user experience), and in response to determining that one or more images in a set of images are likely to produce motion judders, the display system may set FRC to OFF so that the one or more images are replicated instead of interpolated to simulate or generate motion judders in rendered images. In another example, in response to determining that the user preferences indicate a preference for viewing smooth motion in images (or a dislike for motion judders), and in response to determining that one or more images in a set of images are likely to produce motion judders, the display system may set FRC to HIGH so that the one or more images are interpolated instead of replicated to simulate or generate smooth motions in rendered images.

4. EXAMPLE VIDEO ENCODERS AND DECODERS

Figure 3A:
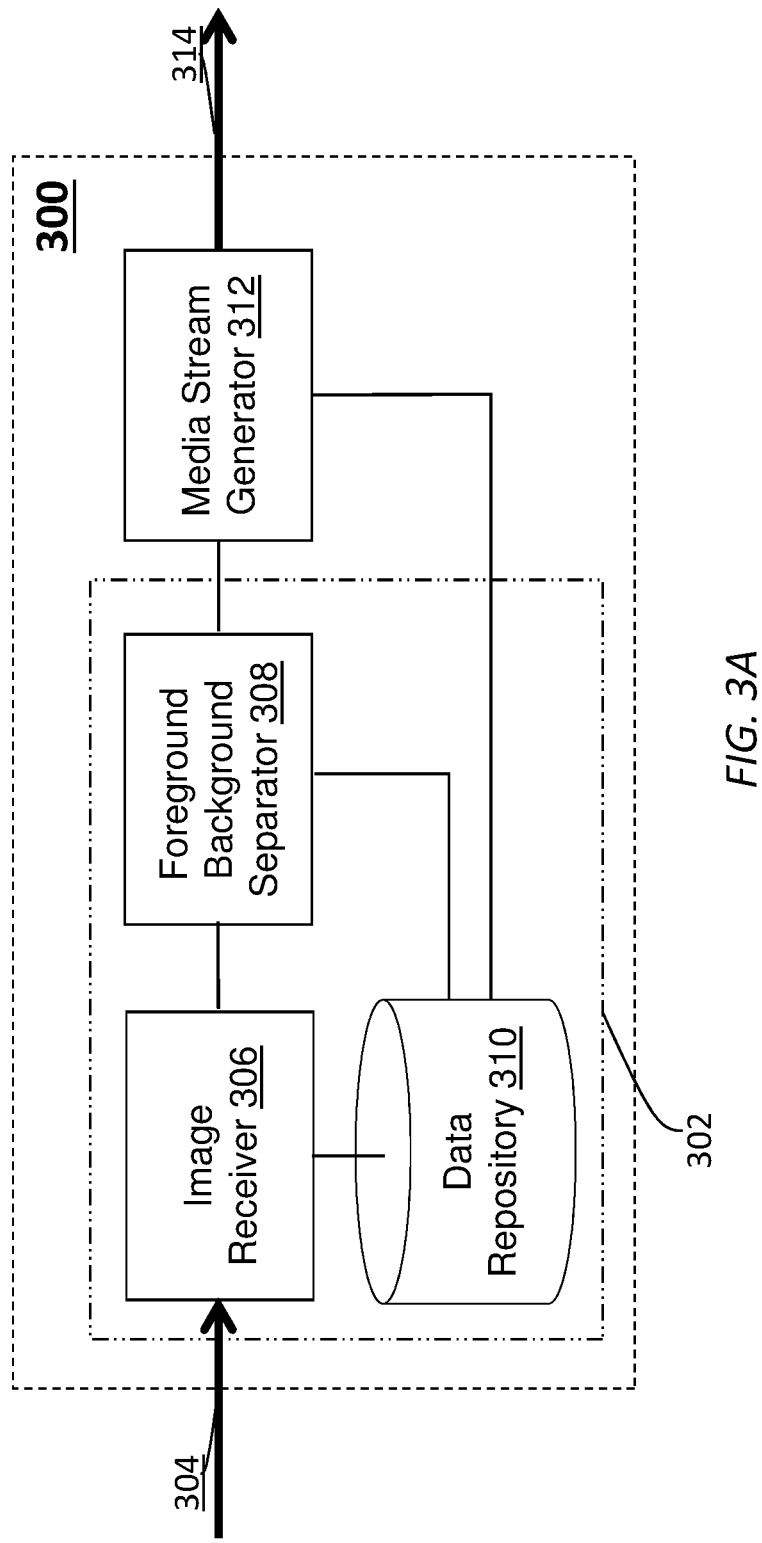
FIG. 3A through FIG. 3C illustrate example video encoders and clients.

FIG. 3A illustrates an example video encoder 300 that comprises an image processor 302, a medium stream generator 312, etc. In some embodiments, the image processor (302) comprises an image receiver 306, a foreground background separator 308, a data repository 310, etc. Some or all of the components of the video encoder (300) may be implemented by one or more devices, modules, units, etc., in software, hardware, a combination of software and hardware, etc.

In some embodiments, the image receiver (306) comprises software, hardware, a combination of software and hardware, etc., configured to receive an image stream (e.g., encoded with an image sequence representing a media program, etc.) 304 from an image source such as a cloud-based image source, a camera system in connection with a VR application, an AR application, a remote presence application, a display application, etc.; decode the image stream (304) into one or more sets of images (e.g., one or more scenes in a media program, a sequence of images, etc.); etc.

In some embodiments, the foreground background separator (308) comprises software, hardware, a combination of software and hardware, etc., configured to separate foreground objects and background regions in the images, determine textures and motion characteristics of the separated foreground objects and the background regions, determine one or more types of each of some or all of the images, etc.

Example image types may include, but are not necessarily limited to only, any of: images for which image interpolation introduces a relatively high likelihood/probability for motion dragging artifacts to occur, images for which image interpolation introduces a moderate likelihood/probability for motion dragging artifacts to occur, images for which image interpolation introduces no or a relatively low likelihood/probability for motion dragging artifacts to occur, images with foreground object(s) contrasting with background region(s) in texture and/or motion, images with foreground object(s) similar to background region(s) in texture and/or motion, images with foreground object(s) and background region(s) in smooth texture, images with foreground object(s) and/or background region(s) that are relatively sensitive to one or more noise-related operations (e.g., sharpening filtering, noise reduction operations, etc.), images that are relatively insensitive to one or more noise-related operations, images with foreground object(s) and/or background region(s) that are relatively sensitive to one or more image enhancement operations (e.g., color enhancement operations, saturation boosting, etc.), images that are relatively insensitive to one or more image enhancement operations, etc.

In some embodiments, the different image types may be used by the foreground background separator (308) to generate image metadata such as FRC-related metadata, noise level metadata, enhancement sensitivity metadata, etc.

Additionally, optionally, or alternatively, in some embodiments, the different image types may be determined based at least in part on input image metadata (e.g., input FRC-related metadata, input noise level metadata, input enhancement sensitivity metadata, etc.) received with and decoded from the image stream (304). In some embodiments, image metadata as described herein may be generated by the video encoder (300) and/or an upstream system. In some embodiments, the upstream system may be an upstream spherical video encoder, which generates the image stream (304) and/or delivers the image stream (304) to the video encoder (300) through one or more network connections.

In some embodiments, image metadata as described herein may be generated by the video encoder (300) and/or the upstream system by performing image content analyses on the image stream (304). Such image content analyses may be performed using one or more of: optical flow analysis techniques, non-optical flow analysis techniques, motion analysis techniques, luminance/chroma based analysis techniques, face detection techniques, object detection techniques, deep learning-based techniques, neural-network-based techniques, any combination of one or more computer vision techniques such as Haar Filters, wavelet decomposition, Fourier space based spatial resolution tracking, etc.

In some embodiments, the data repository (310) represents one or more databases, one or more data storage units/modules/devices, etc., configured to support operations such as storing, updating, retrieving, deleting, etc., with respect to some or all of the images, image metadata such as FRC-related metadata, noise level metadata, enhancement sensitivity metadata, etc.

In some embodiments, the medium stream generator (312) comprises software, hardware, a combination of software and hardware, etc., configured to generate a video stream encoded with an image sequence comprising images (which may or may not be identical to the images) derived from the images and further encoded with the image metadata comprising one or more of: FRC-related metadata, noise level metadata, enhancement sensitivity metadata, etc.; provide/transmit the video stream via a data flow 314 directly or indirectly through intermediate devices, etc., to a set-top device, a video decoder, a display device, a storage device, a sync device, a streaming client, etc.

For the purpose of illustration, it has been described that FRC-related metadata can be generated by a video encoder and transmitted to a video decoder for selecting optimal FRC operational modes (e.g., FRC upscaling, FRC downscaling, etc.) for converting from a first image refresh rate of media content to a second different device-specific image refresh rate of an image rendering device. It should be noted that in various embodiments, FRC-related metadata can also be already computed, for example by a codec in a video encoding device upstream to the video encoder. Instead of decoding media content and computing optical flow in the media content, the video encoder can analyze motion vectors of foreground objects and background regions already computed by the video encoding device and generate the FRC related metadata directly from the motion vectors of the foreground objects and the background regions. Additionally, optionally or alternatively, instead of or in addition to generating FRC-related metadata by a video encoder from analyzing media content and/or from already computed motion vectors of foreground objects and background regions by a codec upstream to the video encoder, in various embodiments, some or all of FRC related metadata as described herein can also be generated from analyzing media content and/or from already computed motion vectors of foreground objects and background regions during encoding, decoding, transcoding, and/or even by an end user device such as a television or mobile device, etc. Thus, some or all of FRC related metadata as described herein may be generated in these and other image processing/rendering stages.

Additionally, optionally, or alternatively, some or all of image processing operations such as scene cut detections, display management, content mapping, color mapping, etc., may be performed by the video encoder (300).

The video encoder (300) may be used to support real time display applications, near-real-time display applications, non-real-time display applications, virtual reality, augmented reality, helmet mounted display applications, heads up display applications, games, 2D display applications, 3D display applications, multi-view display applications, etc. For example, some or all of images, output images, the image metadata, etc., are generated or accessed by the video encoder (300) in real time, in near real time, etc.

Figure 3B:
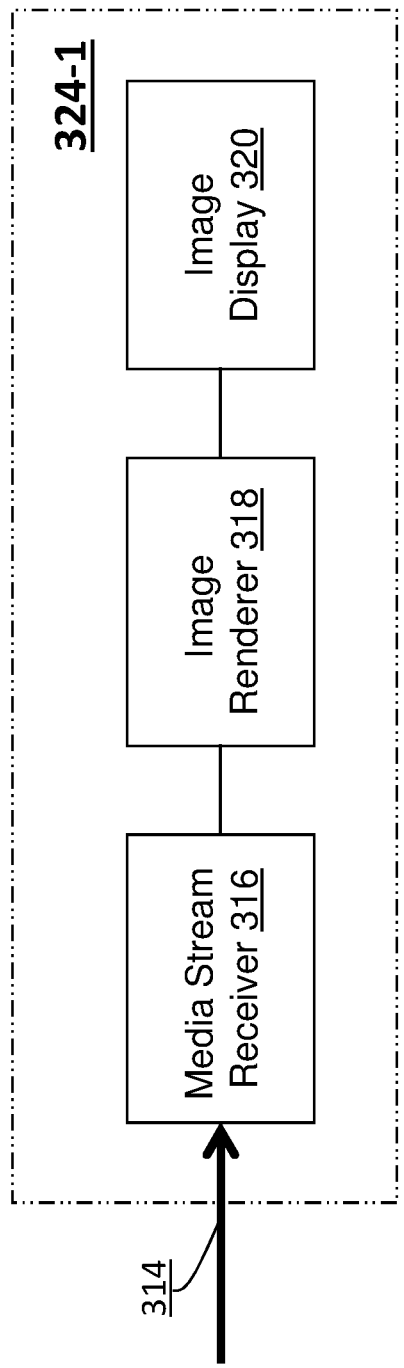

FIG. 3B illustrates an example video decoder 324-1 that comprises a media stream receiver 316, an image renderer 318, an image display 320, etc. Some or all of the components of the video decoder (324-1) may be implemented by one or more devices, modules, units, etc., in software, hardware, a combination of software and hardware, etc.

In some embodiments, the medium stream receiver (316) comprises software, hardware, a combination of software and hardware, etc., configured to receive the video stream encoded with the image sequence comprising the one or more sets of images in the media program and further encoded with the image metadata comprising one or more of: the FRC-related metadata, the noise level metadata, the enhancement sensitivity metadata, etc., via the data flow (314).

In some embodiments, the image renderer (318) comprises software, hardware, a combination of software and hardware, etc., configured to decode images from the video stream; decode the FRC-related metadata from the video stream; determining optimal FRC operational modes for the images; apply image replications and/or image interpolation to the decoded images based on the optimal FRC operational modes determined for the decoded images to generate additional images from the decoded images for the purpose of converting an input image refresh rate of the decoded images to a device-specific image refresh rate of the video decoder (324-1) or the image display (320); perform image processing operations on the decoded images and the additional images to be rendered on the image display (320), where the images are decoded from the video stream received by the video decoder (324-1); output processed images to the image display (320) for rendering; etc.

Example image processing operations performed by the image renderer (318) may include, but are not necessarily limited to, any of: image replications in an FRC OFF mode, image interpolations in an FRC HIGH mode, image interpolations in an FRC MED mode, image interpolations in an FRC LOW mode, image sharpening filtering, noise reduction operations, image enhancement operations, color enhancement operations, saturation boosting, etc.

For the purpose of illustration, it has been described that FRC-related metadata can be transmitted to and used by a video decoder for selecting optimal FRC operational modes (e.g., FRC upscaling, etc.) for converting from a relatively low image refresh rate of media content to a relatively high device-specific image refresh rate of an image rendering device. It should be noted that in various embodiments, FRC-related metadata can also be used by a video decoder for selecting optimal FRC operational modes (e.g., FRC downscaling, etc.) for converting from a relatively high image refresh rate of media content to a relatively low device-specific image refresh rate of an image rendering device. For example, in operational scenarios in which images with smooth textures are indicated/determined for foreground objects and background regions surrounding/bordering the foreground object in images based on the FRC-related metadata, an FRC operational mode for performing relatively strong image combination/interpolation may be predicted and/or selected. On the other hand, in operational scenarios in which images with unsmooth textures and contrasting motions are indicated/determined for foreground objects and background regions surrounding/bordering the foreground object in images based on the FRC-related metadata, an FRC operational mode for performing relatively weak or no image combination/prediction may be predicted and/or selected. Thus, FRC-related metadata as described herein may be used in these and other image processing operations.

Additionally, optionally, or alternatively, some or all of image processing/rendering operations such as display management, content mapping, tone mapping, color mapping, prediction, etc., may be performed by the video decoder (324-1).

The video decoder (324-1) may be used to support real time display applications, near-real-time display applications, non-real-time display applications, virtual reality, augmented reality, helmet mounted display applications, heads up display applications, games, 2D display applications, 3D display applications, multi-view display applications, etc. For example, some or all of images, image metadata, etc., are generated or accessed by the video decoder (324-1) in real time, in near real time, etc.

Techniques as described herein can be implemented in a variety of system architectures. Some or all image processing operations as described herein can be implemented by one or more of cloud-based video encoders, video encoders collocated with or incorporated into video decoders, video decoders, video decoders, display devices, etc. Based on one or more factors such as types of display applications, bandwidth/bitrate budgets, computing capabilities, resources, loads, etc., of recipient devices, computing capabilities, resources, loads, etc., of video encoders and/or computer networks, etc., some image analyzing/processing/rendering operations can be performed by a video encoder, while some other image analyzing/processing/rendering operations can be performed by a video decoder, a video decoder, a display device, etc.

Figure 3C:
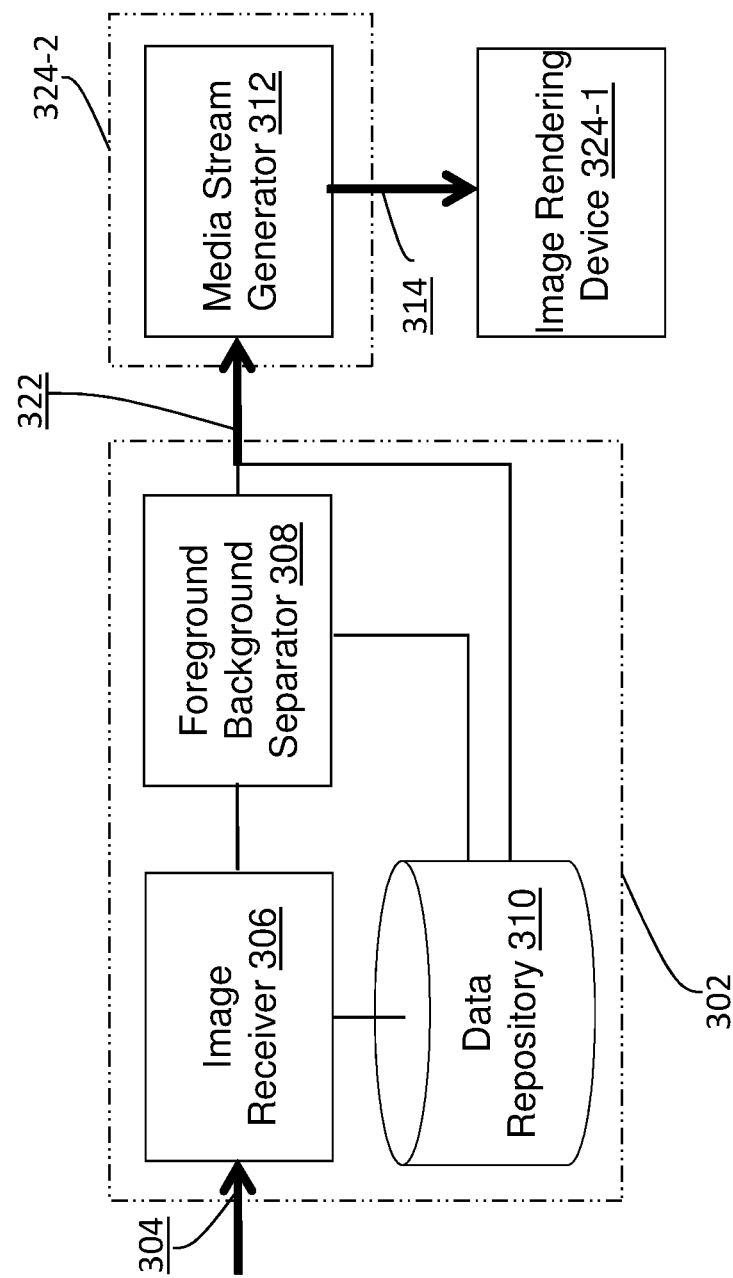

FIG. 3C illustrates an example configuration in which a media stream generator (e.g., 312, etc.) is incorporated into an edge video encoder 324-2. In some embodiments, an image processor 302 of FIG. 3C may be cloud-based. In some embodiments, the image processor (302) may be located in a core network separate from edge devices such as the edge video encoder (324-2). As in FIG. 3A, the image processor (302) may comprise an image receiver 306, a foreground background separator 308, a data repository 310, etc. The image processor (302) may represent an upstream video encoder that communicates with the edge video encoder (324-2) over one or more network connections in one or more of a wide variety of relatively high bitrates to relatively low bitrates. Some or all of the components of the image processor (302) and/or the edge video encoder (324-2) may be implemented by one or more devices, modules, units, etc., in software, hardware, a combination of software and hardware, etc.

In some embodiments, the image processor (302) is configured to output images (e.g., images, etc.) and image metadata in a data flow 322 to downstream devices one of which may be the edge video encoder (324-2).

In some embodiments, the edge video encoder (324-2), or the medium stream generator (312) therein, comprises software, hardware, a combination of software and hardware, etc., configured to generate a video stream encoded with an image sequence comprising images (which may or may not be identical to the images) derived from the images and further encoded with the image metadata comprising one or more of: FRC-related metadata, noise level metadata, enhancement sensitivity metadata, etc.; provide/transmit the video stream via the data flow (314) directly or indirectly through intermediate devices, etc., to a set-top device, a video decoder, a display device, a storage device, a sync device, etc.

In some embodiments, a video decoder (e.g., 324-1), or an image renderer (e.g., 318 of FIG. 3B) therein, comprises software, hardware, a combination of software and hardware, etc., configured to perform image rendering/processing operations on images to be rendered on the image display (320), where the images are decoded from the video stream received by the video decoder (324-1); output processed images to the image display (320) for rendering; etc.

5. EXAMPLE PROCESS FLOWS

Figure 4A:
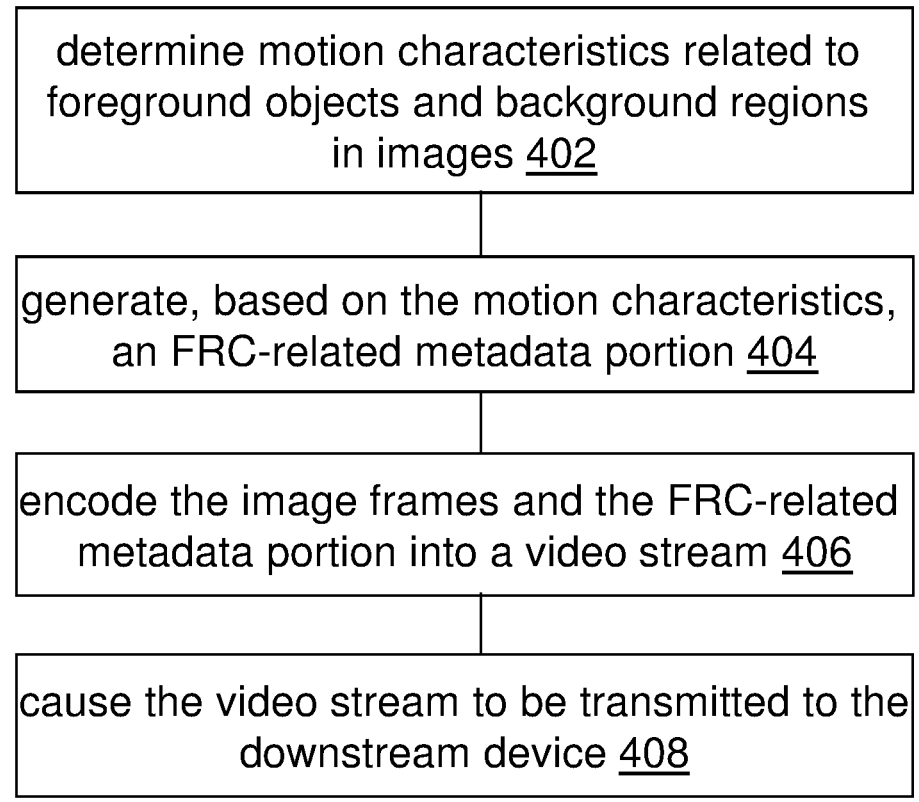

FIG. 4A illustrates an example process flow according to an example embodiment of the present invention. In some example embodiments, one or more computing devices or components may perform this process flow. In block 402, a video encoder (e.g., a video encoder of FIG. 3A or FIG. 3B, etc.) determines one or more motion characteristics related to one or more foreground objects and one or more background regions bordering the one or more foreground objects in one or more images.

In block 404, the video encoder generates, based at least in part on the one or more motion characteristics related to the one or more foreground objects and the one or more background regions bordering the one or more foreground objects in the one or more images, a frame rate conversion (FRC)-related metadata portion. The FRC-related metadata portion is to be used for determining an optimal FRC operational mode with a downstream device for the one or more images.

In block 406, the video encoder encodes the one or more images into a video stream. The FRC-related metadata portion is encoded into the video stream as a part of image metadata.

In block 408, the video encoder causes the video stream to be transmitted to the downstream device.

In an embodiment, the one or more motion characteristics are computed after the one or more foreground objects and the one or more background regions are separated in the one or more images using one or more optical-flow image analysis methods.

In an embodiment, the one or more motion characteristics are computed after the one or more foreground objects and the one or more background regions are separated in the one or more images using one or more non-optical-flow image analysis methods.

In an embodiment, the one or more optical-flow image analysis methods comprise one or more of: operations generating one or more optical flows based on image content visually depicted in the one or more images, operations generating and completing edges between the foreground objects and the background regions from one or more optical flows, operations flood filling closed edges of the foreground objects, operations generating one or more binary masks delineating the foreground objects and the background regions, morphological operations performed on edges detected from one or more optical flow, morphological operations performed on one or more binary masks directly or indirectly derived from one or more optical flows, etc.

In an embodiment, the one or more motion characteristics include one or more of: pixel-based motion vector magnitudes, pixel-block-based motion vector magnitudes, scene-based motion vector magnitudes, pixel-based motion vector directions, pixel-block-based motion vector directions, scene-based motion vector directions, etc.

In an embodiment, the FRC-related metadata portion is generated further based at least in part on texture information determined for the one or more foreground objects and the one or more background regions.

In an embodiment, the one or more images belong to a set of images that represent a scene; the optimal FRC operational mode applies to all images in the set of images that represent the scene.

In an embodiment, the video stream is encoded with an image sequence representing a first time sequence of images that include the one or more images; the first time sequence of images supports a first image refresh rate in normal playing of the time sequence of images; the downstream device supports a second different image refresh rate in normal playing; the downstream device is to operate the optimal FRC operational mode to generate, based on the one or more images decoded from the video stream, additional images for complying with the second image refresh rate.

In an embodiment, the one or more images comprise a plurality of spatial regions; the plurality of spatial regions respectively corresponds to a plurality of sets of motion characteristics; each spatial region in the plurality of spatial regions corresponds to a respective set of motion characteristics; the optimal FRC operational mode represents a FRC operational mode optimally selected from a plurality of FRC operational modes for a specific spatial region in the plurality of spatial regions of the one or more images; the motion metadata portion is to be used to determine a second optimal FRC operational mode with the downstream device that represents a second different FRC operational mode optimally selected from the plurality of FRC operational modes for a second specific spatial region in the plurality of spatial regions of the one or more images.

In an embodiment, the plurality of FRC operational modes comprises two or more FRC operational modes indicating different levels of image interpolation.

In an embodiment, at least one of the one or more motion characteristics related to the one or more foreground objects and the one or more background regions bordering the one or more foreground objects in the one or more images is determined based on motion vectors in one or more images; the motion vectors are already pre-computed by an upstream device.

In an embodiment, the FRC-related metadata portion includes one or more probability values to indicate whether motion dragging is likely to occur in derived images interpolated from the one or more images.

In an embodiment, each of the one or more probability values is computed based at least in part on one or more of: a difference between an overall motion vector magnitude of a foreground object and a background region bordering the foreground object as determined for the one or more images; a difference between an overall motion vector direction of the foreground object and the background region as determined for the one or more images; a texture of the foreground object as determined for the one or more images; a texture of the background region; etc.

In an embodiment, the one or more probability values comprises a scene-based probability value to indicate whether a scene that includes in the one or more images is likely to have motion dragging with image interpolation; the scene-based probability is computed based at least in part on one or more of: a difference between an overall motion vector magnitude of a foreground object and a background region bordering the foreground object in the scene, a difference between an overall motion vector direction of the foreground object and the background region in the scene, a texture of the foreground object in the scene, a texture of the background region in the scene, etc.

In an embodiment, the one or more probability values comprises a scene-based probability value to indicate whether a scene that includes in the one or more images is likely to have motion dragging with image interpolation; the scene-based probability is computed based at least in part on a percentage of images in the scene that are determined to be likely to have motion dragging with image interpolation.

FIG. 4B illustrates an example process flow according to an example embodiment of the present invention. In some example embodiments, one or more computing devices or components may perform this process flow. In block 452, a video decoder (e.g., a video decoder of FIG. 3A through FIG. 3C, etc.) decodes, from a video stream, one or more images and a frame rate conversion (FRC)-related metadata portion. The FRC-related metadata portion is generated by an upstream device for the one or more images based at least in part on one or more motion characteristics related to one or more foreground objects and one or more background regions bordering the one or more foreground objects in the one or more images. The one or more motion characteristics are computed after the one or more foreground objects and the one or more background regions are separated based on image content visually depicted in one or more images.

In block 454, the video decoder uses the FRC-related metadata portion to determine an optimal FRC operational mode for the one or more images.

In block 456, the video decoder operates the optimal FRC operational mode to generate, based on the one or more images, zero or more additional images in addition to the one or more images.

In block 458, the video decoder causes the one or more images and the zero or more additional images to be rendered on a display device.

In an embodiment, the FRC-related metadata portion includes one or more probability values to indicate whether motion dragging is likely to occur in derived images interpolated from the one or more images.

In an embodiment, the optimal FRC operational mode represents a specific FRC operational mode selected from a plurality of FRC operational modes for the one or more images.

In an embodiment, the plurality of FRC operational modes comprises two or more FRC operational modes indicating different levels of image interpolation.

In an embodiment, the FRC-related metadata portion for the one or more images indicates avoiding generating the one or more additional images using image interpolation of the one or more images in the optimal FRC operational mode.

In an embodiment, the FRC-related metadata portion for the one or more images indicates generating the one or more additional images using image interpolation of the one or more images in the optimal FRC operational mode.

In an embodiment, the video decoder is further configured to change to a different FRC operational mode at a scene cut separating two adjacent scenes.

In an embodiment, the video decoder is further configured to perform: determining whether to perform image interpolation with respect to the one or more images based at least in part on user preferences of a user to which the one or more images are to be rendered.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

6. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
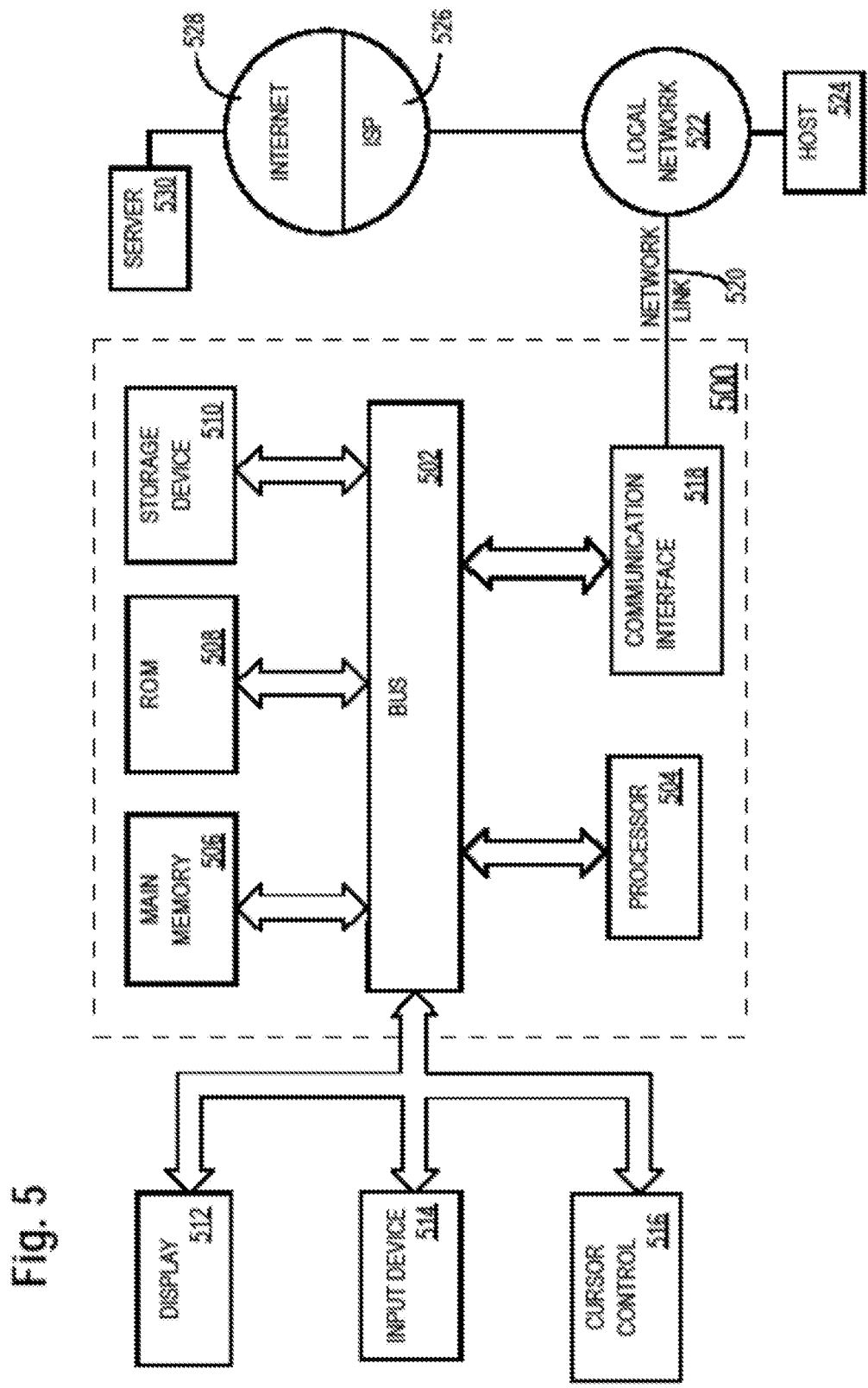
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. EQUIVALENTS, EXTENSIONS, ALTERNATIVES AND MISCELLANEOUS

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    determining one or more motion characteristics related to one or more foreground objects and one or more background regions bordering the one or more foreground objects in one or more images;
    generating, based at least in part on the one or more motion characteristics related to the one or more foreground objects and the one or more background regions bordering the one or more foreground objects in the one or more images, a frame rate conversion (FRC)-related metadata portion, wherein the FRC-related metadata portion is to be used for determining an optimal FRC operational mode with a downstream device for the one or more images;
    encoding the one or more images into a video stream, wherein the FRC-related metadata portion is encoded into the video stream as a part of image metadata, wherein the FRC-related metadata portion indicates changing from a different FRC operational mode to the optimal FRC operational mode at a scene cut separating two adjacent scenes;
    causing the video stream to be transmitted to the downstream device.

2. The method of claim 1, wherein the one or more motion characteristics are computed after the one or more foreground objects and the one or more background regions are separated in the one or more images using one or more optical-flow image analysis methods.

3. The method of claim 2, wherein the one or more optical-flow image analysis methods comprise one or more of: operations generating one or more optical flows based on image content visually depicted in the one or more images, operations generating and completing edges between the foreground objects and the background regions from one or more optical flows, operations flood filling closed edges of the foreground objects, operations generating one or more binary masks delineating the foreground objects and the background regions, morphological operations performed on edges detected from one or more optical flow, or morphological operations performed on one or more binary masks directly or indirectly derived from one or more optical flows.

4. The method of claim 1, wherein the one or more motion characteristics are computed after the one or more foreground objects and the one or more background regions are separated in the one or more images using one or more non-optical-flow image analysis methods.

5. The method of claim 1, wherein the one or more motion characteristics include one or more of: pixel-based motion vector magnitudes, pixel-block-based motion vector magnitudes, scene-based motion vector magnitudes, pixel-based motion vector directions, pixel-block-based motion vector directions, or scene-based motion vector directions.

6. The method of claim 1, wherein the FRC-related metadata portion is generated further based at least in part on texture information determined for the one or more foreground objects and the one or more background regions.

7. The method of claim 1, wherein the one or more images belong to a set of images that represent a scene; and wherein the optimal FRC operational mode applies to all images in the set of images that represent the scene.

8. The method of claim 1, wherein the video stream is encoded with an image sequence representing a first time sequence of images that include the one or more images;

wherein the first time sequence of images supports a first image refresh rate in playing of the time sequence of images; wherein the downstream device supports a second different image refresh rate in playing; and wherein the downstream device is to operate the optimal FRC operational mode to generate, based on the one or more images decoded from the video stream, additional images for complying with the second image refresh rate.

9. The method of claim 1, wherein the one or more images comprise a plurality of spatial regions; wherein the plurality of spatial regions respectively corresponds to a plurality of sets of motion characteristics; wherein each spatial region in the plurality of spatial regions corresponds to a respective set of motion characteristics; wherein the optimal FRC operational mode represents a FRC operational mode optimally selected from a plurality of FRC operational modes for a specific spatial region in the plurality of spatial regions of the one or more images; and wherein the motion metadata portion is to be used to determine a second optimal FRC operational mode with the downstream device that represents a second different FRC operational mode optimally selected from the plurality of FRC operational modes for a second specific spatial region in the plurality of spatial regions of the one or more images.

10. The method of claim 9, wherein the plurality of FRC operational modes comprises two or more FRC operational modes indicating different levels of image interpolation.

11. The method of claim 1, wherein at least one of the one or more motion characteristics related to the one or more foreground objects and the one or more background regions bordering the one or more foreground objects in the one or more images is determined based on motion vectors in one or more images, and wherein the motion vectors are already pre-computed by an upstream device.

12. The method of claim 1, wherein the FRC-related metadata portion includes one or more probability values to indicate whether motion dragging is probable to occur in derived images interpolated from the one or more images.

13. The method of claim 12, wherein each of the one or more probability values is computed based at least in part on one or more of: a difference between an overall motion vector magnitude of a foreground object and a background region bordering the foreground object as determined for the one or more images; a difference between an overall motion vector direction of the foreground object and the background region as determined for the one or more images; a texture of the foreground object as determined for the one or more images; or a texture of the background region.

14. The method of claim 12, wherein the one or more probability values comprises a scene-based probability value to indicate whether a scene that includes in the one or more images is probable to have motion dragging with image interpolation, and wherein the scene-based probability is computed based at least in part on one or more of: a difference between an overall motion vector magnitude of a foreground object and a background region bordering the foreground object in the scene, a difference between an overall motion vector direction of the foreground object and the background region in the scene, a texture of the foreground object in the scene, or a texture of the background region in the scene.

15. The method of claim 12, wherein the one or more probability values comprises a scene-based probability value to indicate whether a scene that includes in the one or more images is probable to have motion dragging with image interpolation, and wherein the scene-based probability is computed based at least in part on a percentage of images in the scene that are determined to be probable to have motion dragging with image interpolation.

16. A method, comprising:
decoding, from a video stream, one or more images and a frame rate conversion (FRC)-related metadata portion, wherein the FRC-related metadata portion is generated by an upstream device for the one or more images based at least in part on one or more motion characteristics related to one or more foreground objects and one or more background regions bordering the one or more foreground objects in the one or more images, wherein the one or more motion characteristics are computed after the one or more foreground objects and the one or more background regions are separated based on image content visually depicted in one or more images;
using the FRC-related metadata portion to determine an optimal FRC operational mode for the one or more images and to change to the optimal FRC operational mode from a different FRC operational mode at a scene cut separating two adjacent scenes;
operating the optimal FRC operational mode to generate, based on the one or more images, zero or more additional images in addition to the one or more images;
causing the one or more images and the zero or more additional images to be rendered on a display device.

17. The method of claim 16, wherein the FRC-related metadata portion includes one or more probability values to indicate whether motion dragging is probable to occur in derived images interpolated from the one or more images.

18. The method of claim 16, wherein the optimal FRC operational mode represents a specific FRC operational mode selected from a plurality of FRC operational modes for the one or more images.

19. The method of claim 18, wherein the plurality of FRC operational modes comprises two or more FRC operational modes indicating different levels of image interpolation.

20. The method of claim 16, wherein the FRC-related metadata portion for the one or more images indicates avoiding generating the one or more additional images using image interpolation of the one or more images in the optimal FRC operational mode.

21. The method of claim 16, wherein the FRC-related metadata portion for the one or more images indicates generating the one or more additional images using image interpolation of the one or more images in the optimal FRC operational mode.

22. The method of claim 16, further comprising determining whether to perform image interpolation with respect to the one or more images based at least in part on user preferences of a user to which the one or more images are to be rendered.

* * * * *